US011906638B2

(12) United States Patent
Wang et al.

(10) Patent No.: US 11,906,638 B2
(45) Date of Patent: Feb. 20, 2024

(54) HIGH-ACCURACY SATELLITE POSITIONING METHOD, POSITIONING TERMINAL, AND POSITIONING SYSTEM

(71) Applicant: HUAWEI TECHNOLOGIES CO., LTD., Guangdong (CN)

(72) Inventors: Meng Wang, Beijing (CN); Hui Li, Shenzhen (CN); Yi Zhang, Beijing (CN); Fuxiang Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 287 days.

(21) Appl. No.: 17/358,246

(22) Filed: Jun. 25, 2021

(65) Prior Publication Data

US 2021/0318451 A1  Oct. 14, 2021

Related U.S. Application Data

(63) Continuation of application No. PCT/CN2019/128501, filed on Dec. 26, 2019.

(30) Foreign Application Priority Data

Dec. 27, 2018  (CN) .......................... 201811610889.X

(51) Int. Cl.
*G01S 19/43* (2010.01)
*G01S 19/40* (2010.01)
(Continued)

(52) U.S. Cl.
CPC .............. *G01S 19/43* (2013.01); *G01S 19/40* (2013.01); *G01S 19/48* (2013.01); *G01S 19/50* (2013.01); *G06N 3/08* (2013.01)

(58) Field of Classification Search
CPC .......... G01S 19/43; G01S 19/40; G01S 19/48; G01S 19/50; G01S 19/45; G06N 3/08
(Continued)

(56) References Cited

U.S. PATENT DOCUMENTS

| 7,227,496 B2 * | 6/2007 | Bird ........................ G01S 19/43 |
| | | 342/357.41 |
| 8,120,527 B2 * | 2/2012 | Ashjaee .................. G01S 19/54 |
| | | 342/357.27 |

(Continued)

FOREIGN PATENT DOCUMENTS

| CN | 101398478 A | 4/2009 |
| CN | 105589087 A | 5/2016 |

(Continued)

OTHER PUBLICATIONS

3rd Generation Partnership Project; Technical Specification Group Services and System Aspects; Service requirements for the 5G system; Stage 1 (Release 16), 3GPP TS 22.261 V16.5.0 (Sep. 2018), 67 pages.

(Continued)

*Primary Examiner* — Chuong P Nguyen
(74) *Attorney, Agent, or Firm* — HUAWEI TECHNOLOGIES CO., LTD.

(57) ABSTRACT

A high-accuracy positioning method and a corresponding positioning system and positioning terminal are provided, and may be used in the field of intelligent vehicle technologies. In this positioning method, a real-time kinematics (RTK) positioning technology and a multi-receiver constraint MRC positioning technology are used to determine a location of a to-be-positioned target. In this positioning method, an RTK error correction model and an MRC error correction model may be preconstructed according to a big data technology. The RTK error correction model is used to provide a correction value for an original detection value obtained based on the RTK positioning technology. The MRC error correction model is used to provide a correction value for an original detection value obtained based on the MRC positioning technology. Then, the correction values (Continued)

are used to calculate the location of the to-be-positioned target.

16 Claims, 21 Drawing Sheets

(51) Int. Cl.
*G01S 19/48* (2010.01)
*G01S 19/50* (2010.01)
*G06N 3/08* (2023.01)

(58) Field of Classification Search
USPC .... 342/352, 357.26, 357.23, 357.31, 357.33, 342/357.28
See application file for complete search history.

(56) References Cited

U.S. PATENT DOCUMENTS

| | | |
|---|---|---|
| 8,271,194 B2 | 9/2012 | Whitehead et al. |
| 8,694,250 B2 | 4/2014 | Talbot et al. |
| 9,116,228 B2 * | 8/2015 | Ellum ..................... G01S 19/04 |
| 10,082,578 B2 * | 9/2018 | De Jong ............... G01S 19/072 |
| 10,634,796 B2 * | 4/2020 | Shen ..................... G01S 19/426 |
| 2009/0189804 A1 | 7/2009 | Ashjaee et al. |
| 2012/0086598 A1 * | 4/2012 | Aghili ..................... G01S 19/54 342/357.3 |
| 2016/0033648 A1 * | 2/2016 | Overbeck ............... G01S 19/42 342/357.25 |
| 2017/0343679 A1 | 11/2017 | Shen et al. |
| 2018/0120445 A1 * | 5/2018 | Dill ......................... G01S 19/41 |

FOREIGN PATENT DOCUMENTS

| | | | |
|---|---|---|---|
| CN | 106802426 A | 6/2017 | |
| CN | 106501826 B | 8/2017 | |
| CN | 107534842 A | 1/2018 | |
| CN | 108020854 A | 5/2018 | |
| CN | 109581442 A | 4/2019 | |
| CN | 110361692 A * | 10/2019 | ........... G01S 5/0257 |

OTHER PUBLICATIONS

Mosavi MR, Comparing DGPS corrections prediction using neural network, fuzzy neural network, and Kalman filter, GPS Solutions, Springer, Berlin, DE, vol. 10, No. 2, May 1, 2006, pp. 97-107, XP019357609.

* cited by examiner

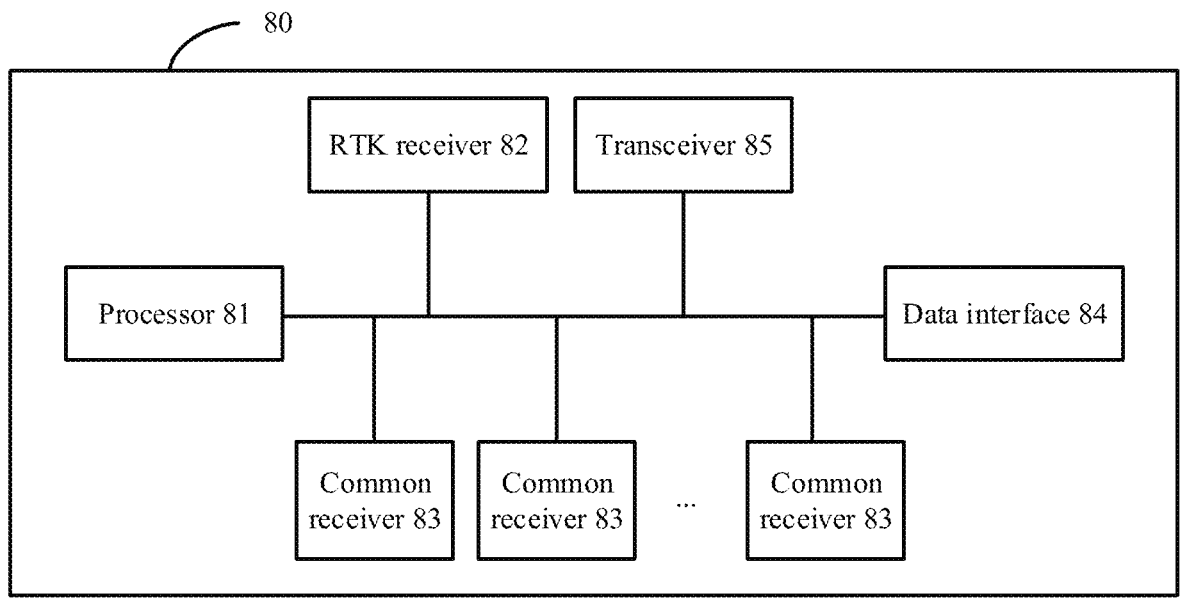

FIG. 8

S21. Input an original detection value of a real-time kinematic RTK receiver into an RTK error correction model, to obtain a first-type correction value through calculation S22. Input a converted detection value of the RTK receiver into a multi-receiver constraint MRC error correction model, to obtain a second-type correction value through calculation, so that a positioning terminal can correct the original detection value of the RTK receiver based on the first-type correction value to obtain a corrected detection value of the RTK receiver, correct an original detection value of each common receiver based on a third-type correction value to obtain a corrected detection value of each common receiver, and perform fusion calculation by using the corrected detection value of each common receiver and the corrected detection value of the RTK receiver, to obtain a positioning result of the RTK receiver

FIG. 9

HIGH-ACCURACY SATELLITE POSITIONING METHOD, POSITIONING TERMINAL, AND POSITIONING SYSTEM

CROSS-REFERENCE TO RELATED APPLICATIONS

This application is a continuation of International Application No. PCT/CN2019/128501, filed on Dec. 26, 2019, which claims priority to Chinese Patent Application No. 201811610889.X, filed on Dec. 27, 2018. The disclosures of the aforementioned applications are hereby incorporated by reference in their entireties.

TECHNICAL FIELD

This application relates to the field of satellite positioning technologies, and particularly, to a high-accuracy satellite positioning method, a positioning terminal, and a positioning system.

BACKGROUND

A current mainstream positioning technology is a real-time kinematics (RTK) positioning technology, which is a differential positioning technology and is also referred to as a carrier phase differentiation technology. The positioning technology relates to a reference station and a mobile station. The two measurement stations each detect a satellite in a global positioning system (GPS). The reference station sends a carrier phase detection value detected by the reference station to the mobile station. The mobile station forms a phase difference detection value by using a carrier phase detection value detected by the mobile station and the carrier phase detection value received from the reference station, and calculates coordinates of the mobile station through difference calculation by using the phase difference detection value.

The real-time kinematics (RTK) positioning technology relies on detection of carrier signals of satellites. In an urban environment, the reference station may be disposed at an open place such as the top of a building, to have a better satellite detection condition. However, when the mobile station is moving, the mobile station usually cannot detect a carrier signal continuously and stably due to tall buildings and trees, resulting in low accuracy of a carrier phase detection value detected by the mobile station, and low positioning accuracy of the mobile station.

SUMMARY

This application relates to a positioning method, and the positioning method is used to improve positioning accuracy to some extent. In addition, this application further provides a positioning system corresponding to the positioning method and a positioning terminal located in the positioning system.

According to a first aspect, this application relates to a positioning method, and the method includes at least the following steps.

A positioning terminal performs detection in a satellite navigation system, to obtain an original detection message.

It should be noted that the positioning terminal includes N common receivers and one real-time kinematics (RTK) receiver, where N is an integer greater than or equal to 3, the N common receivers are located at N vertices of a regular N-gon, and the RTK receiver is located at a geometric center of the regular N-gon. The common receiver has at least a capability of measuring a pseudorange between the common receiver and a satellite that is located in the satellite navigation system and that is detected by the common receiver. The RTK receiver has at least a capability of performing an RTK positioning algorithm. The original detection message includes an original detection value of each common receiver and an original detection value of the RTK receiver. The original detection value of the common receiver includes a pseudorange between the common receiver and each of a plurality of satellites that are located in the satellite navigation system and that are detected by the common receiver. The original detection value of the RTK receiver includes a carrier or a pseudorange between the RTK receiver and each of a plurality of satellites that are located in the satellite navigation system and that are detected by the RTK receiver.

The correction value calculation service station inputs the original detection value of the RTK receiver into an RTK error correction model, to obtain a first-type correction value through calculation, and inputs a converted detection value of the RTK receiver into a multi-receiver constraint (MRC) error correction model, to obtain a second-type correction value through calculation.

It should be noted that the converted detection value of the RTK receiver is obtained by converting the original detection value of each common receiver based on a location relationship between the common receiver and the RTK receiver.

The positioning terminal corrects the original detection value of the RTK receiver by using the first-type correction value, to obtain a corrected detection value of the RTK receiver, corrects the original detection value of each common receiver by using a third-type correction value, to obtain a corrected detection value of each common receiver, and performs fusion calculation by using the corrected detection value of each common receiver and the corrected detection value of the RTK receiver, to obtain a positioning result of the RTK receiver.

It should be noted that the third-type correction value is obtained through calculation based on the second-type correction value and the location relationship between the common receiver and the RTK receiver.

In this embodiment, when positioning is performed on the RTK receiver, pseudoranges obtained by a plurality of common receivers by detecting a plurality of satellites in the satellite navigation system and pseudoranges or carriers obtained by the RTK receiver by detecting a plurality of satellites in the satellite navigation system are required. Because a pseudorange is obtained based on an analog signal, and a carrier is obtained based on a digital signal, in this embodiment, at least the plurality of common receivers detect analog signals. It should be learned that compared with the digital signal, the analog signal has better robustness and anti-interference performance during propagation. Therefore, in this embodiment, original detection values of the plurality of common receivers have relatively good robustness and anti-interference performance, and an error of the original detection values of the plurality of common receivers is relatively small, so that a relatively accurate positioning result can be obtained by using the positioning method provided in this embodiment.

Further, in the positioning method provided in this embodiment, the positioning terminal has the N common receivers, and there is a specific location relationship between the N common receivers (specifically, the N common receivers are located at the N vertices of the regular N-gon). Because disposing of the N common receivers can eliminate, to some extent, an error caused by a multipath effect, a more accurate positioning result can be obtained by using the positioning method provided in this embodiment.

It should be explained that, if a signal transmitted by a satellite arrives at a receiver through a straight path between the satellite and the receiver, a signal received by the receiver may be used to calculate a delay of the signal transmitted by the satellite. However, actually, in a process in which a signal transmitted by the satellite is propagated to the receiver, a plurality of different signals are generated due to reflection of some objects, and propagation directions, amplitudes, polarization, phases, and the like of the plurality of different signals are different from those of the signal propagated to the receiver through the straight path. After arriving at the receiver, the plurality of different signals superimposed on the signal that arrives at the receiver through the straight path. This phenomenon is referred to as the multipath effect.

In addition, in this embodiment, the RTK error correction model and the MRC error correction model are further preconstructed in the correction value calculation service station. The RTK error correction model can generate the first correction value used to correct the original detection value of the RTK receiver. The MRC error correction model can generate the second correction value, and after the second correction value is converted into the third correction value, the third correction value can be used to correct the original detection value of each common receiver. Then, the original detection value of the RTK receiver is corrected by using the first correction value, to obtain the corrected detection value of the RTK receiver, and the original detection value of each common receiver is corrected by using the third correction value, to obtain the corrected detection value of each common receiver. Finally, the fusion calculation is performed by using the corrected detection value of each common receiver and the corrected detection value of the RTK receiver, to obtain the positioning result of the RTK receiver.

In this embodiment, both the original detection value of the receiver and the original detection value of each common receiver are corrected. Therefore, the positioning result of the RTK receiver can be calculated by using the corrected correction values, so that a more accurate positioning result can be obtained.

Optionally, the original detection value of the RTK receiver includes the carrier between the RTK receiver and each of the plurality of satellites that are located in the satellite navigation system and that are detected by the RTK receiver, and the original detection value of the common receiver includes the pseudorange between the common receiver and each of the plurality of satellites that are located in the satellite navigation system and that are detected by the common receiver.

In this embodiment, the RTK receiver detects a carrier, and the carrier is a digital signal. Because the digital signal has a better anti-noise capability than an analog signal, a more accurate positioning result of the RTK receiver is obtained through calculation by using the carrier.

With reference to the first aspect, in a first possible implementation, the positioning terminal converts the original detection value of each common receiver into the converted detection value of the RTK receiver based on the location relationship between the common receiver and the RTK receiver, and sends the converted detection value of the RTK receiver to the correction value calculation service station. Correspondingly, the correction value calculation service station receives the converted detection value of the RTK receiver. In this embodiment, the positioning terminal converts the original detection value of each common receiver into the converted detection value of the RTK receiver. In this case, the correction value calculation service station has a relatively light burden, and only needs to perform calculation based on the received converted detection value of the RTK receiver.

With reference to the first aspect, in a second possible implementation, the positioning terminal sends the original detection value of each common receiver to the correction value calculation service station. Correspondingly, the correction value calculation service station receives the original detection value of each common receiver, and converts the original detection value of each common receiver into the converted detection value of the RTK receiver based on the location relationship between the common receiver and the RTK receiver. In this embodiment, the correction value calculation service station converts the original detection value of each common receiver into the converted detection value of the RTK receiver. In this case, the positioning terminal only needs to obtain the original detection message, and send the original detection message to the correction value calculation service station. Therefore, an internal change of the positioning terminal is relatively small, and setting of the positioning terminal is relatively simple.

With reference to the first aspect, the first possible implementation of the first aspect, or the second possible implementation of the first aspect, in a third possible implementation, the correction value calculation service station converts the second-type correction value into the third-type correction value based on the location relationship between the common receiver and the RTK receiver, and sends the third-type correction value to the positioning terminal. Correspondingly, the positioning terminal receives the third-type correction value. In this embodiment, the correction value calculation service station not only obtains the second-type correction value, but also converts the second-type correction value into the third-type correction value. However, the positioning terminal only needs to correct the original detection value of each common receiver based on the third-type correction value after receiving the third-type correction value. Therefore, in this embodiment, the positioning terminal performs fewer operations, and correspondingly, an internal structure change of the positioning terminal is relatively small.

With reference to the first aspect, the first possible implementation of the first aspect, or the second possible implementation of the first aspect, in a fourth possible implementation, the correction value calculation service station sends the second-type correction value to the positioning terminal. Correspondingly, the positioning terminal receives the second-type correction value, and converts the second-type correction value into the third-type correction value based on the location relationship between the common receiver and the RTK receiver. In this embodiment, after obtaining the second-type correction value, the correction value calculation service station sends the second-type correction value to the positioning terminal. After receiving the second-type correction value, the positioning terminal needs to convert the second-type correction value into the third-type correction value, and then correct the original detection value of each common receiver based on the third-type correction value. Therefore, in this embodiment, because the correction value calculation service station does not need to convert the second-type correction value into the third-type correction value, an internal setting change of the correction value calculation service station is relatively small.

With reference to any one of the first aspect or the first to the fourth possible implementations of the first aspect, in a fifth possible implementation, the positioning terminal sends the original detection value of the RTK receiver to the correction value calculation service station. Correspondingly, the correction value calculation service station receives the original detection value of the RTK receiver.

With reference to any one of the first aspect or the first to the fifth possible implementations of the first aspect, in a sixth possible implementation, the correction value calculation service station sends the first-type correction value to the positioning terminal. Correspondingly, the positioning terminal receives the first-type correction value.

With reference to any one of the first aspect or the first to the sixth possible implementations of the first aspect, in a seventh possible implementation, the step of fusion calculation specifically includes: The positioning terminal obtains a resolved location of each common receiver through calculation by using the corrected detection value of each common receiver according to an MRC positioning algorithm. Then, the positioning terminal obtains a resolved location of the geometric center of the regular N-gon through calculation based on the resolved location of each common receiver. Further, the positioning terminal obtains a resolved location of the RTK receiver through calculation by using the corrected detection value of the RTK receiver according to the RTK positioning algorithm. Finally, the positioning terminal performs fusion calculation on the resolved location of the geometric center of the regular N-gon and the resolved location of the RTK receiver by using a probability model, to obtain the positioning result of the RTK receiver.

In this embodiment, the positioning result of the RTK receiver is calculated based on the resolved location of the geometric center of the regular N-gon and the resolved location of the RTK receiver. Because the RTK receiver is located at the geometric center of the regular N-gon, a more accurate positioning result of the RTK receiver can be obtained through the fusion calculation on the resolved location of the geometric center of the regular N-gon and the resolved location of the RTK receiver.

With reference to any one of the first aspect or the first to the seventh possible implementations of the first aspect, in an eighth possible implementation, the RTK error correction model is constructed according to a regression equation $y=f(x)$, x is the original detection value of the RTK receiver, y is the first-type correction value, $f(\bullet)$ is a mapping function from x to y, and $f(\bullet)$ is obtained through training after a neural network is constructed and the carrier or the pseudorange between the RTK receiver and each satellite detected by the RTK receiver is input into the neural network. In this embodiment, the RTK error correction model is obtained by preconstructing the neural network and then training by using big data. Therefore, the first-type correction value obtained by using the RTK error correction model is relatively accurate. Subsequently, after the original detection value of the RTK receiver is corrected by using the first-type correction value, a relatively accurate corrected detection value of the RTK receiver can be obtained. Naturally, when the positioning result of the RTK receiver is calculated by using the corrected detection value of the RTK receiver, a relatively accurate positioning result can be obtained.

With reference to any one of the first aspect or the first to the seventh possible implementations of the first aspect, in a ninth possible implementation, the MRC error correction model is constructed according to a regression equation $y=f(x)$, x is the original detection value of each common receiver, y is the second-type correction value, $f(\bullet)$ is a mapping function from x to y, and $f(\bullet)$ is obtained through training after a neural network is constructed and a pseudorange between each common receiver and each satellite detected by the corresponding common receiver is input into the neural network. In this embodiment, the MRC error correction model is obtained by preconstructing the neural network and then training by using big data. Therefore, the second-type correction value obtained by using the MRC error correction model is relatively accurate. In this way, after the second-type correction value is converted into the third-type correction value, and the original detection value of each common receiver is corrected by using the third-type correction value, a relatively accurate corrected detection value of each common receiver can be obtained. Further, when the positioning result of the RTK receiver is calculated by using the corrected detection value of each common receiver, a relatively accurate positioning result can be obtained.

According to a second aspect, this application provides a positioning system. The system includes a positioning terminal and a correction value calculation service station.

The positioning terminal is configured to perform detection in a satellite navigation system, to obtain an original detection message.

It should be noted that the positioning terminal includes N common receivers and one real-time kinematics (RTK) receiver, where N is an integer greater than or equal to 3, the N common receivers are located at N vertices of a regular N-gon, and the RTK receiver is located at a geometric center of the regular N-gon. The common receiver has at least a capability of measuring a pseudorange between the common receiver and a satellite that is located in the satellite navigation system and that is detected by the common receiver. The RTK receiver has at least a capability of performing an RTK positioning algorithm. The original detection message includes an original detection value of each common receiver and an original detection value of the RTK receiver. The original detection value of the common receiver includes a pseudorange between the common receiver and each of a plurality of satellites that are located in the satellite navigation system and that are detected by the common receiver. The original detection value of the RTK receiver includes a carrier or a pseudorange between the RTK receiver and each of a plurality of satellites that are located in the satellite navigation system and that are detected by the RTK receiver.

The correction value calculation service station is configured to input the original detection value of the RTK receiver into an RTK error correction model, to obtain a first-type correction value through calculation, and input a converted detection value of the RTK receiver into a multi-receiver constraint MRC error correction model, to obtain a second-type correction value through calculation.

It should be noted that the converted detection value of the RTK receiver is obtained by converting the original detection value of each common receiver based on a location relationship between the common receiver and the RTK receiver.

The positioning terminal is further configured to correct the original detection value of the RTK receiver by using the first-type correction value, to obtain a corrected detection value of the RTK receiver, and correct the original detection value of each common receiver by using a third-type correction value, to obtain a corrected detection value of each common receiver.

It should be noted that the third-type correction value is obtained through calculation based on the second-type correction value and the location relationship between the common receiver and the RTK receiver.

The positioning terminal is further configured to perform fusion calculation by using the corrected detection value of each common receiver and the corrected detection value of the RTK receiver, to obtain a positioning result of the RTK receiver.

It should be noted that, because the positioning system provided in this embodiment may be used to perform the positioning method in the first aspect, for beneficial effects of this embodiment, refer to the foregoing descriptions of the beneficial effects of the positioning method in the first aspect. Details are not described herein again.

With reference to the second aspect, in a first possible implementation, the positioning terminal is further configured to convert the original detection value of each common receiver into the converted detection value of the RTK receiver based on the location relationship between the common receiver and the RTK receiver, and send the converted detection value of the RTK receiver to the correction value calculation service station. Correspondingly, the correction value calculation service station is further configured to receive the converted detection value of the RTK receiver. In this embodiment, the positioning terminal is further configured to convert the original detection value of each common receiver into the converted detection value of the RTK receiver. In this case, the correction value calculation service station has relatively light burden.

With reference to the second aspect, in a second possible implementation, the positioning terminal is further configured to send the original detection value of each common receiver to the correction value calculation service station. Correspondingly, the correction value calculation service station is further configured to convert the original detection value of each common receiver into the converted detection value of the RTK receiver based on the location relationship between the common receiver and the RTK receiver. In this embodiment, the correction value calculation service station is further configured to convert the original detection value of each common receiver into the converted detection value of the RTK receiver. In this case, the positioning terminal only needs to obtain the original detection message and send the original detection message to the correction value calculation service station. Therefore, an internal change of the positioning terminal is relatively small, and setting of the positioning terminal is relatively simple.

With reference to the second aspect, the first possible implementation of the second aspect, or the second possible implementation of the second aspect, in a third possible implementation, the correction value calculation service station is further configured to convert the second-type correction value into the third-type correction value based on the location relationship between the common receiver and the RTK receiver, and send the third-type correction value to the positioning terminal. Correspondingly, the positioning terminal is further configured to receive the third-type correction value. In this embodiment, the correction value calculation service station is configured to not only obtain the second-type correction value, but also convert the second-type correction value into the third-type correction value. However, the positioning terminal only needs to correct the original detection value of each common receiver based on the third-type correction value after receiving the third-type correction value. Therefore, in this embodiment, the positioning terminal performs fewer operations, and correspondingly, an internal structure change of the positioning terminal is relatively small.

With reference to the second aspect, the first possible implementation of the second aspect, or the second possible implementation of the second aspect, in a fourth possible implementation, the correction value calculation service station is further configured to send the second-type correction value to the positioning terminal. Correspondingly, the positioning terminal is further configured to receive the second-type correction value, and converts the second-type correction value into the third-type correction value based on the location relationship between the common receiver and the RTK receiver. In this embodiment, the correction value calculation service station is configured to: after obtaining the second-type correction value, send the second-type correction value to the positioning terminal. The positioning terminal is configured to receive the second-type correction value, convert the second-type correction value into the third-type correction value, and correct the original detection value of each common receiver based on the third-type correction value. Therefore, in this embodiment, because the correction value calculation service station does not need to convert the second-type correction value into the third-type correction value, an internal setting change of the correction value calculation service station is relatively small. With reference to any one of the second aspect or the first to the fourth possible implementations of the second aspect, in a fifth possible implementation, the positioning terminal is configured to send the original detection value of the RTK receiver to the correction value calculation service station. Correspondingly, the correction value calculation service station is configured to receive the original detection value of the RTK receiver.

With reference to any one of the second aspect or the first to the fifth possible implementations of the second aspect, in a sixth possible implementation, the correction value calculation service station is configured to send the first-type correction value to the positioning terminal. Correspondingly, the positioning terminal is configured to receive the first-type correction value.

With reference to any one of the second aspect or the first to the sixth possible implementations of the second aspect, in a seventh possible implementation, the positioning terminal is specifically configured to obtain a resolved location of each common receiver through calculation by using the corrected detection value of each common receiver according to an MRC positioning algorithm, and obtain a resolved location of the geometric center of the regular N-gon through calculation based on the resolved location of each common receiver.

The positioning terminal is further specifically configured to obtain a resolved location of the RTK receiver through calculation by using the corrected detection value of the RTK receiver according to the RTK positioning algorithm.

Further, the positioning terminal is further specifically configured to perform fusion calculation on the resolved location of the geometric center of the regular N-gon and the resolved location of the RTK receiver by using a probability model, to obtain the positioning result of the RTK receiver.

In this embodiment, the positioning result of the RTK receiver is calculated based on the resolved location of the geometric center of the regular N-gon and the resolved location of the RTK receiver. Because the RTK receiver is located at the geometric center of the regular N-gon, a more accurate positioning result of the RTK receiver can be obtained through the fusion calculation on the resolved location of the geometric center of the regular N-gon and the resolved location of the RTK receiver.

With reference to any one of the second aspect or the first to the seventh possible implementations of the second aspect, in an eighth possible implementation, the RTK error correction model is constructed according to a regression equation $y=f(x)$, x is the original detection value of the RTK receiver, y is the first-type correction value, $f(\cdot)$ is a mapping function from x to y, and $f(\cdot)$ is obtained through training after a neural network is constructed and the carrier or the pseudorange between the RTK receiver and each satellite detected by the RTK receiver is input into the neural network. In this embodiment, the RTK error correction model is obtained by preconstructing the neural network and then training by using big data. Therefore, the first-type correction value obtained by using the RTK error correction model is relatively accurate. Subsequently, after the original detection value of the RTK receiver is corrected by using the first-type correction value, a relatively accurate corrected detection value of the RTK receiver can be obtained. Naturally, when the positioning result of the RTK receiver is calculated by using the corrected detection value of the RTK receiver, a relatively accurate positioning result can be obtained.

With reference to any one of the second aspect or the first to the seventh possible implementations of the second aspect, in a ninth possible implementation, the MRC error correction model is constructed according to a regression equation $y=f(x)$, x is the original detection value of each common receiver, y is the second-type correction value, $f(\cdot)$ is a mapping function from x to y, and $f(\cdot)$ is obtained through training after a neural network is constructed and a pseudorange between each common receiver and each satellite detected by the corresponding common receiver is input into the neural network. In this embodiment, the MRC error correction model is obtained by preconstructing the neural network and then training by using big data. Therefore, the second-type correction value obtained by using the MRC error correction model is relatively accurate. In this way, after the second-type correction value is converted into the third-type correction value, and the original detection value of each common receiver is corrected by using the third-type correction value, a relatively accurate corrected detection value of each common receiver can be obtained. Further, when the positioning result of the RTK receiver is calculated by using the corrected detection value of each common receiver, a relatively accurate positioning result can be obtained.

According to a third aspect, this application provides another positioning method, and the method includes the following steps.

A real-time kinematics (RTK) receiver performs detection in a satellite navigation system, to obtain a first detection signal. It should be noted that, the RTK receiver has at least a capability of performing an RTK positioning algorithm, and there is one RTK receiver.

The first detection signal is parsed, to obtain an original detection value of the RTK receiver. The original detection value of the RTK receiver includes a carrier or a pseudorange between the RTK receiver and each of a plurality of satellites that are located in the satellite navigation system and that are detected by the RTK receiver.

Each of N common receivers performs detection in the satellite navigation system, to obtain a second detection signal. N is an integer greater than or equal to 3, the N common receivers are located at N vertices of a regular N-gon, and the RTK receiver is located at a geometric center of the regular N-gon. The common receiver has at least a capability of measuring a pseudorange between the common receiver and a satellite that is located in the satellite navigation system and that is detected by the common receiver.

The second detection signal is parsed, to obtain an original detection value of each common receiver.

Fusion calculation is performed by using the original detection value of the RTK receiver and the original detection value of each common receiver, to obtain a positioning result of the RTK receiver.

It can be learned from the foregoing that in this embodiment, when positioning is performed on the RTK receiver, pseudoranges obtained by a plurality of common receivers through detection in the satellite navigation system and a pseudorange or a carrier obtained by the RTK receiver through detection in the satellite navigation system are required. Because a pseudorange is obtained based on an analog signal, and a carrier is obtained based on a digital signal, in this embodiment, at least the plurality of common receivers detect analog signals. It should be learned that compared with the digital signal, the analog signal has better robustness and anti-interference performance during propagation. Therefore, in this embodiment, original detection values of the plurality of common receivers have relatively good robustness and anti-interference performance, and an error of the original detection values of the plurality of common receivers is relatively small, so that a relatively accurate positioning result can be obtained by using the positioning method provided in this embodiment.

Further, in the positioning method provided in this embodiment, there is a specific location relationship between the N common receivers (specifically, the N common receivers are located at the N vertices of the regular N-gon). Because disposing of the N common receivers can eliminate, to some extent, an error caused by a multipath effect, a more accurate positioning result can be obtained by using the positioning method provided in this embodiment.

With reference to the third aspect, in a first possible implementation, the step of fusion calculation specifically includes the following content: obtaining a resolved location of each common receiver through calculation by using the original detection value of each common receiver according to a multi-receiver constraint MRC positioning algorithm; obtaining a resolved location of the geometric center of the regular N-gon through calculation based on the resolved location of each common receiver; obtaining a resolved location of the RTK receiver through calculation by using the original detection value of the RTK receiver according to the RTK positioning algorithm; and performing fusion calculation on the resolved location of the geometric center of the regular N-gon and the resolved location of the RTK receiver by using a probability model, to obtain the positioning result of the RTK receiver.

In this embodiment, the positioning result of the RTK receiver is calculated based on the resolved location of the geometric center of the regular N-gon and the resolved location of the RTK receiver. Because the RTK receiver is located at the geometric center of the regular N-gon, a more accurate positioning result of the RTK receiver can be obtained through the fusion calculation on the resolved location of the geometric center of the regular N-gon and the resolved location of the RTK receiver.

According to a fourth aspect, this application provides a positioning terminal. The positioning terminal includes one real-time kinematics (RTK) receiver, N common receivers, and a processor.

N is an integer greater than or equal to 3, the N common receivers are located at N vertices of a regular N-gon, and the RTK receiver is located at a geometric center of the regular N-gon.

It should be noted that, in this embodiment, the RTK receiver has at least a capability of performing an RTK positioning algorithm. The common receiver has at least a capability of measuring a pseudorange between the common receiver and a satellite that is located in a satellite navigation system and that is detected by the common receiver.

Specifically, in the positioning terminal, the RTK receiver is configured to perform detection in the satellite navigation system, to obtain a first detection signal. The processor is configured to parse the first detection signal, to obtain an original detection value of the RTK receiver. The original detection value of the RTK receiver includes a carrier or a pseudorange between the RTK receiver and each of a plurality of satellites that are located in the satellite navigation system and that are detected by the RTK receiver.

Further, each of the N common receivers is configured to perform detection in the satellite navigation system, to obtain a second detection signal. The processor is configured to parse the second detection signal, to obtain an original detection value of each common receiver. The original detection value of the common receiver includes a pseudorange between the common receiver and each of a plurality of satellites that are located in the satellite navigation system and that are detected by the common receiver.

The processor is further configured to perform fusion calculation by using the original detection value of each common receiver and the original detection value of the RTK receiver, to obtain a positioning result of the RTK receiver.

The positioning terminal in this embodiment is configured to perform the positioning method in the third aspect. Therefore, for beneficial effects of this embodiment, refer to the beneficial effects described for the positioning method in the third aspect.

With reference to the fourth aspect, in a first possible implementation, the processor is specifically configured to:

obtain a resolved location of each common receiver through calculation based on the original detection value of each common receiver according to a multi-receiver constraint MRC positioning algorithm, and obtain a resolved location of the geometric center of the regular N-gon through calculation based on the resolved location of each common receiver;

obtain a resolved location of the RTK receiver through calculation by using the original detection value of the RTK receiver according to the RTK positioning algorithm; and perform fusion calculation on the resolved location of the geometric center of the regular N-gon and the resolved location of the RTK receiver by using a probability model, to obtain the positioning result of the RTK receiver.

For beneficial effects of this embodiment, refer to the beneficial effects described in the positioning method in the first possible implementation of the third aspect.

According to a fifth aspect, this application provides a positioning method, and the method includes the following steps.

A real-time kinematics (RTK) receiver performs detection in a satellite navigation system, to obtain a first detection signal.

The first detection signal is parsed, to obtain an original detection value of the RTK receiver.

It should be noted that, the RTK receiver has at least a capability of performing an RTK positioning algorithm, and there is one RTK receiver. The original detection value of the RTK receiver includes a carrier or a pseudorange between the RTK receiver and each of a plurality of satellites that are located in the satellite navigation system and that are detected by the RTK receiver.

Each of N common receivers performs detection in the satellite navigation system, to obtain a second detection signal. It should be noted that N is an integer greater than or equal to 3, the N common receivers are located at N vertices of a regular N-gon, the RTK receiver is located at a geometric center of the regular N-gon, and the common receiver has at least a capability of measuring a pseudorange between the common receiver and a satellite that is located in the satellite navigation system and that is detected by the common receiver.

The second detection signal is parsed, to obtain an original detection value of each common receiver.

Fusion calculation is performed by using a corrected detection value of each common receiver and a corrected detection value of the RTK receiver, to obtain a positioning result of the RTK receiver.

It should be noted that the corrected detection value of the RTK receiver is obtained by correcting the original detection value of the RTK receiver by using a first-type correction value, and the first-type correction value is a correction value generated by a correction value calculation service station for the original detection value of the RTK receiver.

Further, the corrected detection value of each common receiver is obtained by correcting the original detection value of the common receiver by using a third-type correction value. The third-type correction value is obtained by converting a second-type correction value based on a location relationship between the common receiver and the RTK receiver. The second-type correction value is a correction value generated by the correction value calculation service station for a converted detection value of the RTK receiver. The converted detection value of the RTK receiver is obtained by converting the original detection value of each common receiver based on the location relationship between the common receiver and the RTK receiver.

It should be noted that the positioning terminal included in the positioning system according to the second aspect may perform the positioning method in this embodiment. In the positioning method in this embodiment, when positioning is performed on the RTK receiver, pseudoranges obtained by a plurality of common receivers by detecting a plurality of satellites in the satellite navigation system and pseudoranges or carriers obtained by the RTK receiver by detecting a plurality of satellites in the satellite navigation system are required. Because a pseudorange is obtained based on an analog signal, and a carrier is obtained based on a digital signal, in this embodiment, at least the plurality of common receivers detect analog signals. It should be learned that compared with the digital signal, the analog signal has better robustness and anti-interference performance during propagation. Therefore, in this embodiment, original detection values of the plurality of common receivers have relatively good robustness and anti-interference performance, and an error of the original detection values of the plurality of common receivers is relatively small, so that a relatively accurate positioning result can be obtained by using the positioning method provided in this embodiment.

Further, in the positioning method provided in this embodiment, there is a specific location relationship between the N common receivers (specifically, the N common receivers are located at the N vertices of the regular N-gon). Because disposing of the N common receivers can eliminate, to some extent, an error caused by a multipath effect, a more accurate positioning result can be obtained by using the positioning method provided in this embodiment.

With reference to the fifth aspect, in a first possible implementation, the positioning method further includes: sending the original detection value of the RTK receiver to the correction value calculation service station, receiving the first-type correction value returned by the correction value calculation service station for the original detection value of the RTK receiver, and correcting the original detection value of the RTK receiver by using the first-type correction value, to obtain the corrected detection value of the RTK receiver.

Compared with the original detection value of the RTK receiver, the corrected detection value of the RTK receiver is closer to a real value. Therefore, a more accurate positioning result of the RTK receiver is obtained through calculation by using the corrected detection value of the RTK receiver. That is, the positioning terminal in this embodiment is used, to obtain a more accurate positioning result.

With reference to the first possible implementation of the fifth aspect, in a second possible implementation, the method further includes: sending the original detection value of each common receiver to the correction value calculation service station. In this embodiment, only the original detection value of each common receiver needs to be sent to the correction value calculation service station, and the correction value calculation service station converts the original detection value of each common receiver into the converted detection value of the RTK receiver. Therefore, according to the positioning method provided in this embodiment, complexity of positioning the RTK receiver can be reduced.

With reference to the first possible implementation of the fifth aspect, in a third possible implementation, the method further includes: converting the original detection value of each common receiver into the converted detection value of the RTK receiver based on the location relationship between the common receiver and the RTK receiver, and sending the converted detection value of the RTK receiver to the correction value calculation service station.

With reference to the second or the third possible implementation of the fifth aspect, in a fourth possible implementation, the positioning method further includes the following steps: receiving the second-type correction value returned by the correction value calculation service station, converting the second-type correction value into the third-type correction value based on the location relationship between the common receiver and the RTK receiver, and correcting the original detection value of each common receiver by using the third-type correction value, to obtain the corrected detection value of each common receiver.

With reference to the second or the third possible implementation of the fifth aspect, in a fifth possible implementation, the positioning method further includes the following steps: receiving the third-type correction value returned by the correction value calculation service station, and correcting the original detection value of each common receiver by using the third-type correction value, to obtain the corrected detection value of each common receiver. In this embodiment, the third-type correction value that can be directly used to correct the original detection value of each common receiver is received, and the correction value calculation service station converts the second-type correction value into the third-type correction value. Therefore, according to the positioning method provided in this embodiment, complexity of positioning the RTK receiver can be reduced.

With reference to any one of the fifth aspect or the first to the fifth possible implementations of the fifth aspect, in a sixth possible implementation, the step of fusion calculation is specifically as follows: obtaining a resolved location of each common receiver through calculation by using the original detection value of each common receiver according to a multi-receiver constraint MRC positioning algorithm; obtaining a resolved location of the geometric center of the regular N-gon through calculation based on the resolved location of each common receiver; obtaining a resolved location of the RTK receiver through calculation by using the original detection value of the RTK receiver according to the RTK positioning algorithm; and performing fusion calculation on the resolved location of the geometric center of the regular N-gon and the resolved location of the RTK receiver by using a probability model, to obtain the positioning result of the RTK receiver.

In this embodiment, the positioning result of the RTK receiver is calculated based on the resolved location of the geometric center of the regular N-gon and the resolved location of the RTK receiver. Because the RTK receiver is located at the geometric center of the regular N-gon, a more accurate positioning result of the RTK receiver can be obtained through the fusion calculation on the resolved location of the geometric center of the regular N-gon and the resolved location of the RTK receiver.

According to a sixth aspect, this application provides a positioning terminal, and the positioning terminal includes one real-time kinematics (RTK) receiver, N common receivers, and a processor. N is an integer greater than or equal to 3, the N common receivers are located at N vertices of a regular N-gon, and the RTK receiver is located at a geometric center of the regular N-gon. It should be explained that the RTK receiver has at least a capability of performing an RTK positioning algorithm. The common receiver has at least a capability of measuring a pseudorange between the common receiver and a satellite that is located in a satellite navigation system and that is detected by the common receiver.

Specifically, the RTK receiver is configured to perform detection in the satellite navigation system, to obtain a first detection signal.

The processor is configured to parse the first detection signal, to obtain an original detection value of the RTK receiver. The original detection value of the RTK receiver includes a carrier or a pseudorange between the RTK receiver and each of a plurality of satellites that are located in the satellite navigation system and that are detected by the RTK receiver.

Each of the N common receivers is configured to perform detection in the satellite navigation system, to obtain a second detection signal.

The processor is configured to parse the second detection signal, to obtain an original detection value of each common receiver. It should be noted that the original detection value of the common receiver includes a pseudorange between the common receiver and each of a plurality of satellites that are located in the satellite navigation system and that are detected by the common receiver.

The processor is further configured to perform fusion calculation by using a corrected detection value of each common receiver and a corrected detection value of the RTK receiver, to obtain a positioning result of the RTK receiver.

It should be noted that the corrected detection value of each common receiver is obtained by correcting the original detection value of the common receiver by using a third-type correction value. The third-type correction value is obtained by converting a second-type correction value based on a location relationship between the common receiver and the RTK receiver. The second-type correction value is a correction value generated by a correction value calculation service station for a converted detection value of the RTK receiver, and the converted detection value of the RTK receiver is obtained by converting the original detection value of each common receiver based on the location relationship between the common receiver and the RTK receiver.

In addition, the corrected detection value of the RTK receiver is obtained by correcting the original detection value of the RTK receiver by using a first-type correction value. The first-type correction value is a correction value generated by the correction value calculation service station for the original detection value of the RTK receiver.

It should be explained that the positioning terminal provided in this embodiment can perform the positioning method in the fifth aspect. Therefore, for beneficial effects of the positioning terminal provided in this embodiment, refer to the beneficial effects of the positioning method in the fifth aspect. Details are not described herein again.

With reference to the sixth aspect, in a first possible implementation, the positioning terminal further includes a transceiver. The transceiver is configured to send the original detection value of the RTK receiver to the correction value calculation service station, and receive the first-type correction value returned by the correction value calculation service station for the original detection value of the RTK receiver. Correspondingly, the processor is further configured to correct the original detection value of the RTK receiver by using the first-type correction value, to obtain the corrected detection value of the RTK receiver. The positioning terminal provided in this embodiment can perform the positioning method in the first possible implementation of the fifth aspect. Therefore, for beneficial effects of the positioning terminal provided in this embodiment, refer to beneficial effects of the positioning method in the first possible implementation of the fifth aspect. Details are not described herein again.

With reference to the first possible implementation of the sixth aspect, in a second possible implementation, the transceiver is further configured to send the original detection value of each common receiver to the correction value calculation service station. The positioning terminal provided in this embodiment can perform the positioning method in the second possible implementation of the fifth aspect. Therefore, for beneficial effects of the positioning terminal provided in this embodiment, refer to beneficial effects of the positioning method in the second possible implementation of the fifth aspect. Details are not described herein again.

With reference to the first possible implementation of the sixth aspect, in a third possible implementation, the processor is further configured to convert the original detection value of each common receiver into the converted detection value of the RTK receiver based on the location relationship between the common receiver and the RTK receiver. Correspondingly, the transceiver is further configured to send the converted detection value of the RTK receiver to the correction value calculation service station.

With reference to the second or the third possible implementation of the sixth aspect, in a fourth possible implementation, the transceiver is further configured to receive the third-type correction value returned by the correction value calculation service station. Correspondingly, the processor is further configured to correct the original detection value of each common receiver by using the third-type correction value, to obtain the corrected detection value of each common receiver. The positioning terminal provided in this embodiment can perform the positioning method in the fifth possible implementation of the fifth aspect. Therefore, for beneficial effects of the positioning terminal provided in this embodiment, refer to beneficial effects of the positioning method in the fifth possible implementation of the fifth aspect. Details are not described herein again.

With reference to the second or the third possible implementation of the sixth aspect, in a fifth possible implementation, the transceiver is further configured to receive the second-type correction value returned by the correction value calculation service station. Correspondingly, the processor is further configured to convert the second-type correction value into the third-type correction value based on the location relationship between the common receiver and the RTK receiver. The processor is further configured to correct the original detection value of each common receiver by using the third-type correction value, to obtain the corrected detection value of each common receiver.

With reference to any one of the sixth aspect or the first to the fifth possible implementations of the sixth aspect, in a sixth possible implementation, the processor is specifically configured to obtain a resolved location of each common receiver through calculation by using the original detection value of each common receiver according to a multi-receiver constraint MRC positioning algorithm, and obtain a resolved location of the geometric center of the regular N-gon through calculation based on the resolved location of each common receiver. The processor is further specifically configured to obtain a resolved location of the RTK receiver through calculation by using the original detection value of the RTK receiver according to the RTK positioning algorithm. Further, the processor is further specifically configured to perform fusion calculation on the resolved location of the geometric center of the regular N-gon and the resolved location of the RTK receiver by using a probability model, to obtain the positioning result of the RTK receiver.

The positioning terminal provided in this embodiment can perform the positioning method in the sixth possible implementation of the fifth aspect. Therefore, for beneficial effects of the positioning terminal provided in this embodiment, refer to beneficial effects of the positioning method in the sixth possible implementation of the fifth aspect. Details are not described herein again.

According to a seventh aspect, this application provides a positioning method, and the positioning method includes at least the following steps.

An original detection value of a real-time kinematics (RTK) receiver is input into an RTK error correction model, to obtain a first-type correction value through calculation.

It should be explained that the RTK receiver is located in a positioning terminal and has at least a capability of performing an RTK positioning algorithm. The original detection value of the RTK receiver includes a carrier or a pseudorange between the RTK receiver and each of a plurality of satellites that are located in a satellite navigation system and that are detected by the RTK receiver.

A converted detection value of the RTK receiver is input into a multi-receiver constraint MRC error correction model, to obtain a second-type correction value through calculation, so that the positioning terminal can correct the original detection value of the RTK receiver based on the first-type correction value to obtain a corrected detection value of the RTK receiver, correct an original detection value of each common receiver based on a third-type correction value to obtain a corrected detection value of each common receiver, and perform fusion calculation by using the corrected detection value of each common receiver and the corrected detection value of the RTK receiver, to obtain a positioning result of the RTK receiver.

It should be noted that the third-type correction value is obtained by converting the second-type correction value based on a location relationship between the common receiver and the RTK receiver. The converted detection value of the RTK receiver is obtained by converting the original detection value of each of N common receivers based on the location relationship between the common receiver and the RTK receiver. The N common receivers are located in the positioning terminal, and each common receiver has at least a capability of measuring a pseudorange between the common receiver and a satellite that is located in the satellite navigation system and that is detected by the common receiver. N is an integer greater than or equal to 3, the N common receivers are located at N vertices of a regular N-gon, and the RTK receiver is located at a geometric center of the regular N-gon. The original detection value of the common receiver includes a pseudorange between the common receiver and each of a plurality of satellites that are located in the satellite navigation system and that are detected by the common receiver.

It should be noted that the correction value calculation service station included in the positioning system according to the second aspect may perform the positioning method in this embodiment. In the positioning method provided in this embodiment, the RTK error correction model and the MRC error correction model need to be preconstructed. The RTK error correction model is used to generate the first correction value used to correct the original detection value of the RTK receiver. The MRC error correction model is used to generate the second correction value, and after the second correction value is converted into the third correction value, the third correction value is used to correct the original detection value of each common receiver. Therefore, in this embodiment, both the original detection value of the RTK receiver and the original detection value of each common receiver are used for calculation after being corrected. A detection value that has undergone correction is closer to a real value. Therefore, when positioning is performed on the RTK receiver according to the positioning method provided in this embodiment, a more accurate positioning result can be obtained.

With reference to the seventh aspect, in a first possible implementation, the positioning method further includes: receiving the original detection value of the RTK receiver, and sending the first-type correction value to the positioning terminal.

With reference to the first possible implementation of the seventh aspect, in a second possible implementation, the positioning method further includes: receiving the converted detection value of the RTK receiver.

In the positioning method provided in this embodiment, the converted detection value of the RTK receiver is directly received. Therefore, an operation of converting the original detection value of each common receiver into the converted detection value of the RTK receiver does not need to be performed. Therefore, the positioning method provided in this embodiment is relatively simple to perform.

With reference to the first possible implementation of the seventh aspect, in a third possible implementation, the positioning method further includes: receiving the original detection value of each common receiver, and converting the original detection value of each common receiver into the converted detection value of the RTK receiver based on the location relationship between the common receiver and the RTK receiver.

In the positioning method provided in this embodiment, the original detection value of each common receiver further needs to be converted into the converted detection value of the RTK receiver. Therefore, the positioning method provided in this embodiment has a relatively powerful function.

With reference to the second or the third possible implementation of the seventh aspect, in a fourth possible implementation, the positioning method further includes: sending the second-type correction value to the positioning terminal, so that the positioning terminal converts the second-type correction value into the third-type correction value based on the location relationship between the common receiver and the RTK receiver.

In the positioning method provided in this embodiment, after the second-type correction value is generated, the second-type correction value is directly sent to the positioning terminal, that is, an operation of converting the second-type correction value into the third-type correction value does not need to be performed. Therefore, the positioning method provided in this embodiment is relatively simple to perform.

With reference to the second or the third possible implementation of the seventh aspect, in a fifth possible implementation, the positioning method further includes: converting the second-type correction value into the third-type correction value based on the location relationship between the common receiver and the RTK receiver, and sending the third-type correction value to the positioning terminal.

In the positioning method provided in this embodiment, after the second-type correction value is generated, the second-type correction value further needs to be converted into the third-type correction value. Therefore, the positioning method provided in this embodiment has a relatively powerful function.

With reference to any one of the seventh aspect or the first to the fifth possible implementations of the seventh aspect, in a sixth possible implementation, the RTK error correction model is constructed according to a regression equation $y=f(x)$, x is the original detection value of the RTK receiver, y is the first-type correction value, $f(\cdot)$ is a mapping function from x to y, and $f(\cdot)$ is obtained through training after a neural network is constructed and the carrier or the pseudorange between the RTK receiver and each satellite detected by the RTK receiver is input into the neural network.

In this embodiment, the RTK error correction model is obtained by preconstructing the neural network and then training by using big data. Therefore, the first-type correction value obtained by using the RTK error correction model is relatively accurate. After the original detection value of the RTK receiver is corrected by using the first-type correction value, a relatively accurate corrected detection value of the RTK receiver can be obtained. Further, when the positioning result of the RTK receiver is calculated by using the corrected detection value of the RTK receiver, a relatively accurate positioning result can be obtained.

With reference to any one of the seventh aspect or the first to the fifth possible implementations of the seventh aspect, in a seventh possible implementation, the MRC error correction model is constructed according to a regression equation y=f(x), x is the original detection value of each common receiver, y is the second-type correction value, f(•) is a mapping function from x to y, and f(•) is obtained through training after a neural network is constructed and a pseudorange between each common receiver and each satellite detected by the corresponding common receiver is input into the neural network.

In this embodiment, the MRC error correction model is obtained by preconstructing the neural network and then training by using big data. Therefore, the second-type correction value obtained by using the MRC error correction model is relatively accurate. In this way, after the second-type correction value is converted into the third-type correction value, and the original detection value of each common receiver is corrected by using the third-type correction value, a relatively accurate corrected detection value of each common receiver can be obtained. Further, when the positioning result of the RTK receiver is calculated by using the corrected detection value of each common receiver, a relatively accurate positioning result can be obtained.

According to an eighth aspect, this application provides a correction value calculation service station (which may also be referred to as a service station for short). The service station includes a processor and a memory. The memory is configured to store a real-time kinematics (RTK) error correction model and a multi-receiver constraint MRC error correction model.

Specifically, the processor is configured to:

input an original detection value of an RTK receiver into the RTK error correction model, to obtain a first-type correction value through calculation; and input a converted detection value of the RTK receiver into the MRC error correction model, to obtain a second-type correction value through calculation, so that a positioning terminal corrects the original detection value of the RTK receiver based on the first-type correction value, to obtain a corrected detection value of the RTK receiver, corrects an original detection value of each common receiver based on a third-type correction value, to obtain a corrected detection value of each common receiver, and performs fusion calculation by using the corrected detection value of each common receiver and the corrected detection value of the RTK receiver, to obtain a positioning result of the RTK receiver.

It should be noted that the RTK receiver is located in the positioning terminal and has at least a capability of performing an RTK positioning algorithm. The original detection value of the RTK receiver includes a carrier or a pseudorange between the RTK receiver and each of a plurality of satellites that are located in a satellite navigation system and that are detected by the RTK receiver.

Further, the third-type correction value is obtained by converting the second-type correction value based on a location relationship between the common receiver and the RTK receiver.

The converted detection value of the RTK receiver is obtained by converting the original detection value of each of N common receivers based on the location relationship between the common receiver and the RTK receiver. The N common receivers are located in the positioning terminal, and each common receiver has at least a capability of measuring a pseudorange between the common receiver and a satellite that is located in the satellite navigation system and that is detected by the common receiver. N is an integer greater than or equal to 3, the N common receivers are located at N vertices of a regular N-gon, and the RTK receiver is located at a geometric center of the regular N-gon. The original detection value of the common receiver includes a pseudorange between the common receiver and each of a plurality of satellites that are located in the satellite navigation system and that are detected by the common receiver.

The server provided in this embodiment may perform the positioning method in the seventh aspect. Therefore, for beneficial effects of the server in this embodiment, refer to the foregoing descriptions of the beneficial effects of the positioning method in the seventh aspect.

With reference to the eighth aspect, in a first possible implementation, the service station further includes a transceiver. The transceiver is configured to receive the original detection value of the RTK receiver, and send the first-type correction value to the positioning terminal.

With reference to the first possible implementation of the eighth aspect, in a second possible implementation, the transceiver is further configured to receive the converted detection value of the RTK receiver.

The server provided in this embodiment may perform the positioning method in the second possible implementation of the seventh aspect. Therefore, for beneficial effects of the server in this embodiment, refer to the foregoing descriptions of the beneficial effects of the positioning method in the second possible implementation of the seventh aspect.

With reference to the first possible implementation of the eighth aspect, in a third possible implementation, the transceiver is further configured to receive the original detection value of each common receiver. Correspondingly, the processor is further configured to convert the original detection value of each common receiver into the converted detection value of the RTK receiver based on the location relationship between the common receiver and the RTK receiver.

The server provided in this embodiment may perform the positioning method in the third possible implementation of the seventh aspect. Therefore, for beneficial effects of the server in this embodiment, refer to the foregoing descriptions of the beneficial effects of the positioning method in the third possible implementation of the seventh aspect.

With reference to the second or the third possible implementation of the eighth aspect, in a fourth possible implementation, the transceiver is further configured to send the second-type correction value to the positioning terminal, so that the positioning terminal converts the second-type correction value into the third-type correction value based on the location relationship between the common receiver and the RTK receiver.

The server provided in this embodiment may perform the positioning method in the fourth possible implementation of the seventh aspect. Therefore, for beneficial effects of the server in this embodiment, refer to the foregoing descriptions of the beneficial effects of the positioning method in the fourth possible implementation of the seventh aspect.

With reference to the second or the third possible implementation of the eighth aspect, in a fifth possible implementation, the processor is further configured to convert the second-type correction value into the third-type correction value based on the location relationship between the common receiver and the RTK receiver. Correspondingly, the transceiver is further configured to send the third-type correction value to the positioning terminal.

The server provided in this embodiment may perform the positioning method in the fifth possible implementation of the seventh aspect. Therefore, for beneficial effects of the server in this embodiment, refer to the foregoing descriptions of the beneficial effects of the positioning method in the fifth possible implementation of the seventh aspect.

With reference to any one of the eighth aspect or the first to the fifth possible implementations of the eighth aspect, in a sixth possible implementation, the RTK error correction model is constructed according to a regression equation $y=f(x)$, x is the original detection value of the RTK receiver, y is the first-type correction value, $f(\cdot)$ is a mapping function from x to y, and $f(\cdot)$ is obtained through training after a neural network is constructed and the carrier or the pseudorange between the RTK receiver and each satellite detected by the RTK receiver is input into the neural network.

The server provided in this embodiment may perform the positioning method in the sixth possible implementation of the seventh aspect. Therefore, for beneficial effects of the server in this embodiment, refer to the foregoing descriptions of the beneficial effects of the positioning method in the sixth possible implementation of the seventh aspect.

With reference to any one of the eighth aspect or the first to the fifth possible implementations of the eighth aspect, in a seventh possible implementation, the MRC error correction model is constructed according to a regression equation $y=f(x)$, x is the original detection value of each common receiver, y is the second-type correction value, $f(\cdot)$ is a mapping function from x to y, and $f(\cdot)$ is obtained through training after a neural network is constructed and a pseudorange between each common receiver and each satellite detected by the corresponding common receiver is input into the neural network.

The server provided in this embodiment may perform the positioning method in the seventh possible implementation of the seventh aspect. Therefore, for beneficial effects of the server in this embodiment, refer to the foregoing descriptions of the beneficial effects of the positioning method in the seventh possible implementation of the seventh aspect.

According to a ninth aspect, this application provides another correction value calculation service station (which may also be referred to as a service station). In the correction value calculation service station, a storage unit is configured to store a real-time kinematics (RTK) error correction model and a multi-receiver constraint MRC error correction model.

A first calculation unit is configured to input an original detection value of an RTK receiver into the RTK error correction model, to obtain a first-type correction value through calculation.

It should be noted that the RTK receiver is located in a positioning terminal and has at least a capability of performing an RTK positioning algorithm. The original detection value of the RTK receiver includes a carrier or a pseudorange between the RTK receiver and each of a plurality of satellites that are located in a satellite navigation system and that are detected by the RTK receiver.

A second calculation unit is configured to input a converted detection value of the RTK receiver into the MRC error correction model, to obtain a second-type correction value through calculation, so that a positioning terminal corrects the original detection value of the RTK receiver based on the first-type correction value, to obtain a corrected detection value of the RTK receiver, corrects an original detection value of each common receiver based on a third-type correction value, to obtain a corrected detection value of each common receiver, and performs fusion calculation by using the corrected detection value of each common receiver and the corrected detection value of the RTK receiver, to obtain a positioning result of the RTK receiver.

It should be explained that the third-type correction value is obtained by converting the second-type correction value based on a location relationship between the common receiver and the RTK receiver.

The converted detection value of the RTK receiver is obtained by converting the original detection value of each of N common receivers based on the location relationship between the common receiver and the RTK receiver. The N common receivers are located in the positioning terminal, and each common receiver has at least a capability of measuring a pseudorange between the common receiver and a satellite that is located in the satellite navigation system and that is detected by the common receiver. N is an integer greater than or equal to 3, the N common receivers are located at N vertices of a regular N-gon, and the RTK receiver is located at a geometric center of the regular N-gon. The original detection value of the common receiver includes a pseudorange between the common receiver and each of a plurality of satellites that are located in the satellite navigation system and that are detected by the common receiver.

The server provided in this embodiment may perform the positioning method in the seventh aspect. Therefore, for beneficial effects of the server in this embodiment, refer to the foregoing descriptions of the beneficial effects of the positioning method in the seventh aspect.

With reference to the ninth aspect, in a first possible implementation, the service station further includes a transceiver unit. The transceiver unit is configured to receive the original detection value of the RTK receiver, and send the first-type correction value to the positioning terminal.

With reference to the first possible implementation of the ninth aspect, in a second possible implementation, the transceiver unit is further configured to receive the converted detection value of the RTK receiver.

The server provided in this embodiment may perform the positioning method in the second possible implementation of the seventh aspect. Therefore, for beneficial effects of the server in this embodiment, refer to the foregoing descriptions of the beneficial effects of the positioning method in the second possible implementation of the seventh aspect.

With reference to the first possible implementation of the ninth aspect, in a third possible implementation, the correction value calculation service station further includes a first conversion unit. The first conversion unit is configured to receive the original detection value of each common receiver, and convert the original detection value of each common receiver into the converted detection value of the RTK receiver based on the location relationship between the common receiver and the RTK receiver.

The server provided in this embodiment may perform the positioning method in the third possible implementation of the seventh aspect. Therefore, for beneficial effects of the server in this embodiment, refer to the foregoing descriptions of the beneficial effects of the positioning method in the third possible implementation of the seventh aspect.

With reference to the second or the third possible implementation of the ninth aspect, in a fourth possible implementation, the transceiver unit is further configured to send the second-type correction value to the positioning terminal, so that the positioning terminal converts the second-type correction value into the third-type correction value based on the location relationship between the common receiver and the RTK receiver.

The server provided in this embodiment may perform the positioning method in the fourth possible implementation of the seventh aspect. Therefore, for beneficial effects of the server in this embodiment, refer to the foregoing descriptions of the beneficial effects of the positioning method in the fourth possible implementation of the seventh aspect.

With reference to the second or the third possible implementation of the ninth aspect, in a fifth possible implementation, the correction value calculation service station further includes a second conversion unit. The second conversion unit is configured to convert the second-type correction value into the third-type correction value based on the location relationship between the common receiver and the RTK receiver. Correspondingly, the transceiver unit is further configured to send the third-type correction value to the positioning terminal.

The server provided in this embodiment may perform the positioning method in the fifth possible implementation of the seventh aspect. Therefore, for beneficial effects of the server in this embodiment, refer to the foregoing descriptions of the beneficial effects of the positioning method in the fifth possible implementation of the seventh aspect.

With reference to any one of the ninth aspect or the first to the fifth possible implementations of the ninth aspect, in a sixth possible implementation, the RTK error correction model is constructed according to a regression equation $y=f(x)$, x is the original detection value of the RTK receiver, y is the first-type correction value, $f(\cdot)$ is a mapping function from x to y, and $f(\cdot)$ is obtained through training after a neural network is constructed and the carrier or the pseudorange between the RTK receiver and each satellite detected by the RTK receiver is input into the neural network.

The server provided in this embodiment may perform the positioning method in the sixth possible implementation of the seventh aspect. Therefore, for beneficial effects of the server in this embodiment, refer to the foregoing descriptions of the beneficial effects of the positioning method in the sixth possible implementation of the seventh aspect.

With reference to any one of the ninth aspect or the first to the fifth possible implementations of the ninth aspect, in a seventh possible implementation, the MRC error correction model is constructed according to a regression equation $y=f(x)$, x is the original detection value of each common receiver, y is the second-type correction value, $f(\cdot)$ is a mapping function from x to y, and $f(\cdot)$ is obtained through training after a neural network is constructed and a pseudorange between each common receiver and each satellite detected by the corresponding common receiver is input into the neural network.

The server provided in this embodiment may perform the positioning method in the seventh possible implementation of the seventh aspect. Therefore, for beneficial effects of the server in this embodiment, refer to the foregoing descriptions of the beneficial effects of the positioning method in the seventh possible implementation of the seventh aspect.

BRIEF DESCRIPTION OF DRAWINGS

FIG. 4A-1 and FIG. 4A-2 are a schematic diagram of a positioning method according to an embodiment of this application;

FIG. 4B-1 and FIG. 4B-2 are a schematic diagram of a positioning method according to another embodiment of this application;

FIG. 4C-1 and FIG. 4C-2 are a schematic diagram of a positioning method according to still another embodiment of this application;

FIG. 4D-1 and FIG. 4D-2 are a schematic diagram of a positioning method according to yet another embodiment of this application;

FIG. 8 is a schematic flowchart of a positioning terminal according to this application;

FIG. 9 is a schematic flowchart of still another positioning method according to this application;

DESCRIPTION OF EMBODIMENTS

Figure 1:
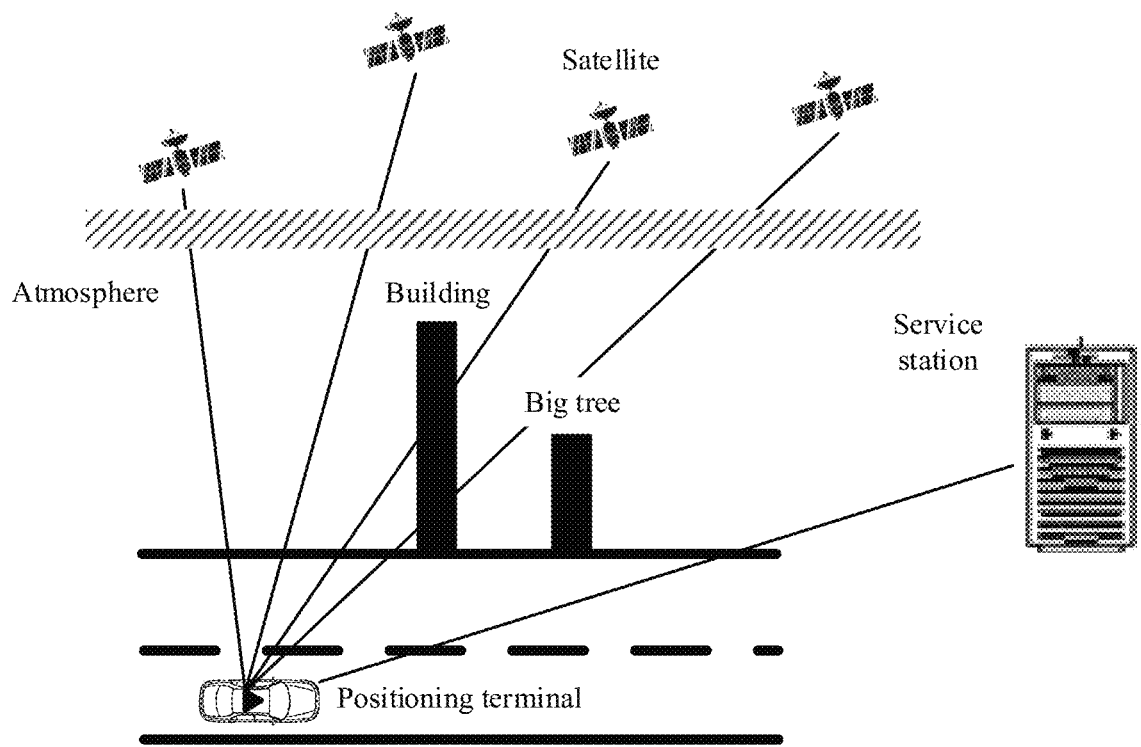
FIG. 1 is a diagram of an application scenario of a positioning method according to this application.

Before the technical solutions in this application are described, the technical terms in this application that are not explained above are first explained.

A reference station is a fixed ground detection station that continuously detects a satellite navigation signal for a long time and transmits detection data to a data center in real time or at regular time through a communications facility.

A mobile station is a detection station set up by a receiver that moves within a range around a reference station.

A multi-receiver constraint (MRC) technology is a technology in which a plurality of receivers are used to perform positioning, and a positioning terminal is positioned by using geometric constraints of locations of the plurality of receivers in the technology.

A global positioning system (GPS), or referred to as a global navigation satellite system or a navigation satellite system, is a medium-distance circular orbit satellite navigation system developed and maintained by the United States Department of Defense. The GPS provides accurate positioning, speed measurement, and high-accuracy standard time for most parts (98%) of the earth's surface. In this application, the navigation satellite system is mainly used for description.

A pseudorange is an approximate distance between a receiver and a satellite during satellite positioning. Assuming that a clock of the satellite and a clock of the receiver are strictly synchronized, a propagation time of a signal can be obtained based on a moment at which the satellite transmits the signal and a moment at which the receiver receives the signal. Then, a distance between the satellite and the receiver can be obtained by multiplying the propagation time and a propagation speed. However, a clock difference between the two clocks is inevitable, and the signal is affected by a factor such as atmospheric refraction during propagation. Therefore, the distance measured directly by using this method is not equal to an actual distance from the satellite to the receiver. This distance is referred to as a pseudorange.

A carrier is a radio wave with a specific frequency. The carrier can broadcast modulated pseudocode and data code in a form of sine wave. Therefore, the carrier can be considered as a bottom layer of a GPS satellite signal. Each satellite in the GPS uses two carrier bands of different frequencies: an L1 carrier band and an L2 carrier band. The L1 carrier band is for civil use, and the L2 carrier band is for military use. A frequency f1 of the L1 carrier band is 1575.42 MHz.

A resolved location is a location determined through calculation. For example, in "obtaining, by a positioning terminal, a resolved location of each common receiver through calculation by using a corrected detection value of each common receiver according to an MRC positioning algorithm", the resolved location of each common receiver is a location, of each common receiver, that is determined through calculation by using the corrected detection value of each common receiver according to the MRC positioning algorithm. Generally, there is a difference between a resolved location of a receiver and an actual physical location of the receiver. The positioning technology provided in this application is to make a resolved location of an RTK receiver closer to an actual physical location of the RTK receiver compared with the prior art.

The following describes a positioning method, a positioning system, a positioning terminal, and a correction value calculation service station in this application.

First Part:

FIG. 1 shows an application scenario of a high-accuracy positioning method according to this application. As shown in FIG. 1, the positioning terminal is disposed on a vehicle, or the positioning terminal is a vehicle-mounted device. When the positioning terminal is disposed on a vehicle, specifically, the positioning terminal may be installed on a top of the vehicle, or may be installed at another location that needs to be positioned. Optionally, the positioning terminal may be specifically a smartphone. The application scenario may be an urban environment including tall buildings and trees, and the vehicle on which the positioning terminal is disposed travels on a road. With reference to FIG. 1, it can be further easily learned that there is a communication connection between the positioning terminal and a service station. Naturally, another relay network device such as a switch may further exist between the positioning terminal and the service station. That is, communication between the positioning terminal and the service station complies with an existing communications protocol and communication manner.

Further, as shown in FIG. 1, the positioning terminal can detect a plurality of satellites (four satellites are shown in FIG. 1) in the GPS. It should be learned that the GPS is located above the atmosphere.

Figure 3:
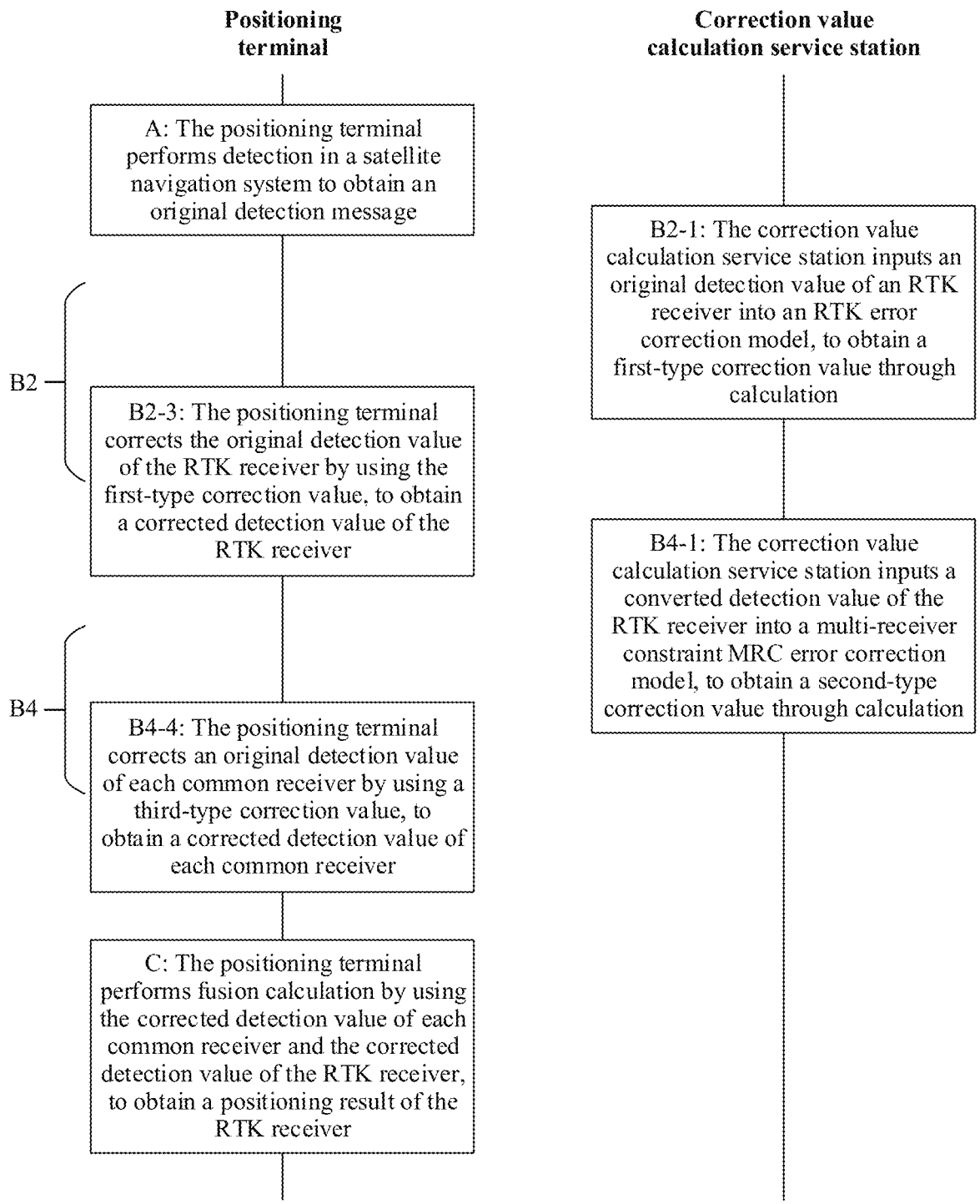
FIG. 3 is a schematic diagram of a positioning method according to this application.

It should be noted that, as shown in FIG. 3, the positioning method provided in this application includes the following steps.

Step A: The positioning terminal performs detection in a satellite navigation system, to obtain an original detection message.

Figure 2:
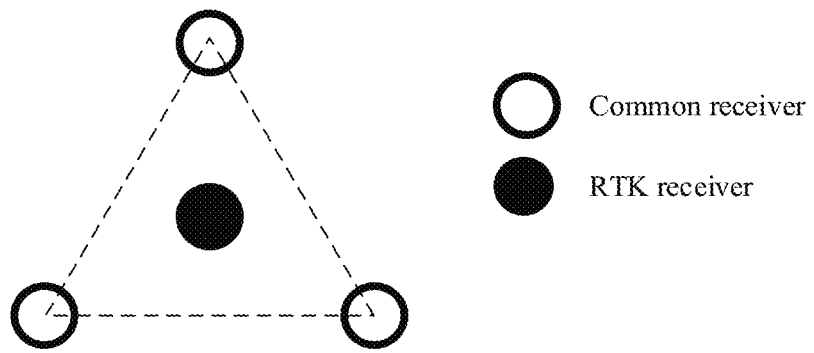
FIG. 2 is a schematic structural diagram of a positioning terminal in a positioning method according to this application.

FIG. 2 is a schematic structural diagram of the positioning terminal according to this application. The positioning terminal includes a plurality of receivers, and the plurality of receivers include N common receivers and one RTK receiver, where N is an integer greater than or equal to 3. The N common receivers are located at N vertices of a regular N-gon (in other words, a geometric topology structure of the N common receivers is a regular N-gon), and the RTK receiver is located at a geometric center of the regular N-gon. The common receiver has at least a capability of measuring a pseudorange between the common receiver and a satellite. It should be learned that the satellite is located in the satellite navigation system and is detected by the common receiver. The RTK receiver is a receiver capable of executing an RTK algorithm.

Optionally, as shown in FIG. 2, the positioning terminal may include three common receivers and one RTK receiver. The three common receivers are located at three vertices of a regular triangle, and the RTK receiver is located at a center of the regular triangle.

It should be noted that the original detection message includes a quantity of the plurality of receivers located in the positioning terminal and an original detection value of each of the plurality of receivers. If the receiver is a common receiver, the original detection value of the receiver includes a pseudorange between the receiver and each of a plurality of satellites detected by the receiver. If the receiver is an RTK receiver, the original detection value of the receiver includes a carrier between the receiver and each of a plurality of satellites detected by the receiver. It should be learned that the plurality of satellites detected by the common receiver and the plurality of satellites detected by the RTK receiver are all located in the satellite navigation system. It should be noted that, generally, the original detection value of the RTK receiver further includes a pseudorange between the RTK receiver and each of the plurality of satellites detected by the RTK receiver. In some cases, a carrier cannot be detected. Therefore, the positioning terminal cannot calculate a resolved location of the RTK receiver by using a carrier. However, the positioning terminal may further calculate the resolved location of the RTK receiver by using a pseudorange, although the resolved location obtained through calculation by using the pseudorange is less accurate than that obtained through calculation by using the carrier.

The common receiver calculates, by using a ranging code, a pseudorange between the common receiver and a satellite detected by the common receiver. The RTK receiver detects, by using a carrier signal, a pseudorange between the RTK receiver and a satellite detected by the RTK receiver.

In a first embodiment of this application, as shown in FIG. 4A-1 to FIG. 4B-2, after step A (or after the positioning terminal obtains the original detection message), the positioning method further includes: The positioning terminal reports the original detection message to a correction value calculation service station (step B1). That the positioning terminal reports the original detection message to the correction value calculation service station specifically means that the positioning terminal encapsulates the original detection message into a packet, and reports the packet to the correction value calculation service station, to request a correction message. Therefore, correspondingly, the correction value calculation service station receives packets of a same format.

It should be noted that a header (referred to as a "packet header" for short) of the packet may include at least a field used to indicate the following information: a number of the correction value calculation service station, the quantity of receivers located in the positioning terminal, the original detection value of the RTK receiver, and the original detection value of each common receiver.

In addition, the packet header may further include fields used to indicate messages such as a message number, a GNSS (Global Navigation Satellite System, global navigation satellite system) epoch, and a GNSS synchronization flag. The message number is used to indicate a number of a correction message request sent by a positioning terminal. The positioning terminal can synchronize a message with the correction value calculation service station based on the message number. In addition, the correction value calculation service station can further determine, based on the message number, the positioning terminal that sends the packet. The GNSS epoch is used to indicate a location at which each receiver detects a satellite. The GNSS synchronization flag is used to indicate whether a plurality of satellites detected by each of the plurality of receivers are detected in a same GNSS epoch. Optionally, if the GNSS synchronization flag is equal to 1, it indicates that the plurality of satellites detected by each of the plurality of receivers are detected in a same GNSS epoch.

As shown in FIG. 4A-1 to FIG. 4B-2, step B2, step B3, and step B4 are further included. It is easy to determine, based on a logical relationship between the steps, that step B3 is performed after step B1 and before step B4. Step B2 includes step B2-1, step B2-2, and step B2-3 (that is, step B2-1 to step B2-3). Step B4 includes step B4-1, step B4-2, step B4-3, and step B4-4 (that is, step B4-1 to step B4-4). It should be noted that, step B2-1 to step B2-3 are performed in sequence. This may also be embodied by a logical relationship of step B2-1 to step B2-3. Specifically, step B2-1 to step B2-3 are performed in a sequence of step B2-1, step B2-2, and step B2-3. Similarly, step B4-1 to step B4-5 are performed in sequence. This may also be embodied by a logical relationship of step B4-1 to step B4-5. Specifically, step B4-1 to step B4-5 are performed in a sequence of step B4-1, step B4-2, step B4-3, step B4-4, and step B4-5.

It should be noted that there is no specific sequence between step B2 and step B3. Further, there is no specific sequence between step B2 and step B4. Step B2 and step B4 may be performed in a sequence shown in FIG. 4A-1 to FIG. 4B-2. To be specific, step B2 is performed before step B4, or step B4 may be performed before step B2. More likely, some steps in step B2 and some steps in step B4 are simultaneously performed, and other steps in step B2 and other steps in step B4 are alternately performed (that is, the steps are not performed simultaneously but are performed in sequence).

Figures 1, 4A:
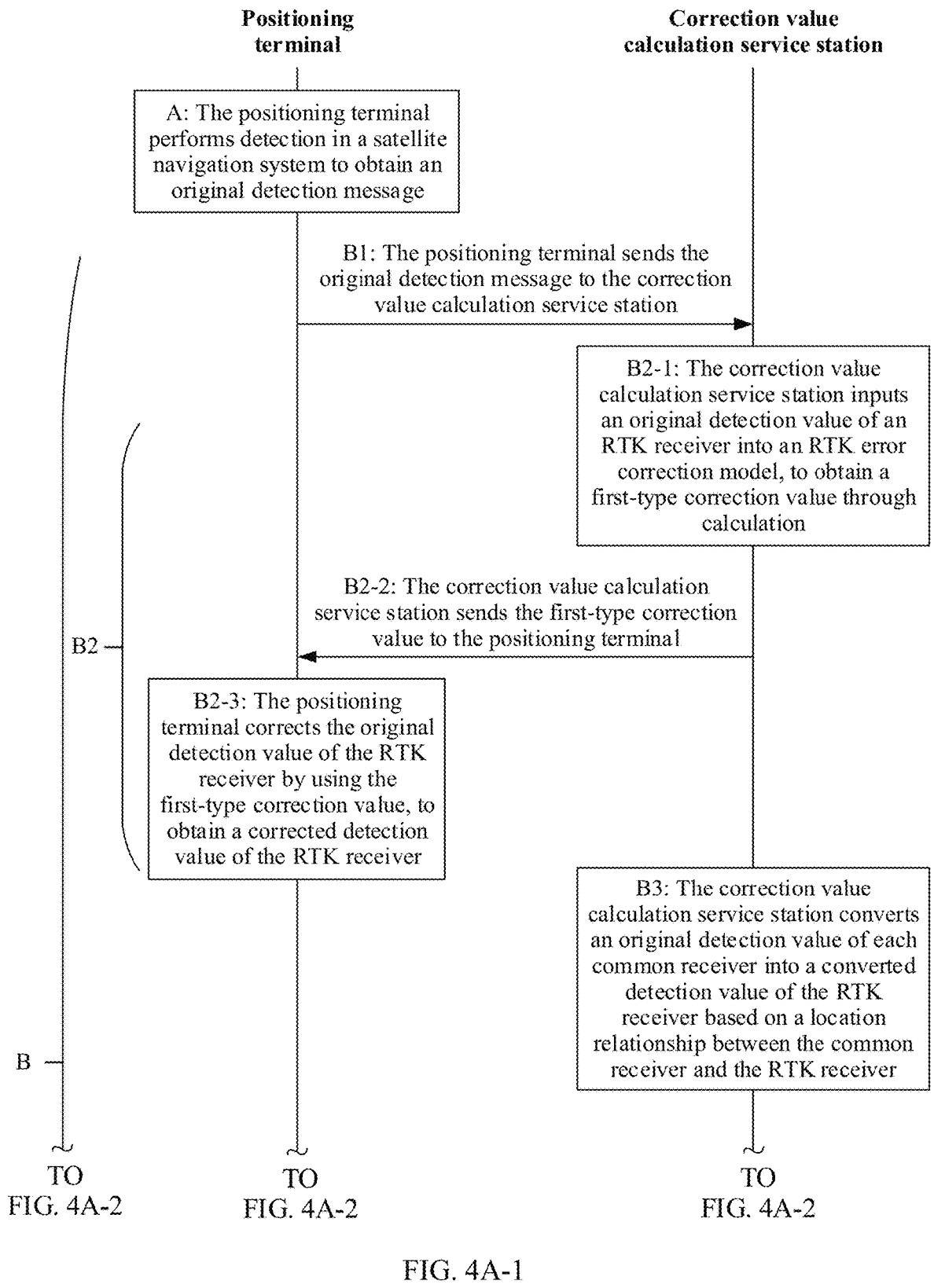
Figures 2, 4A:
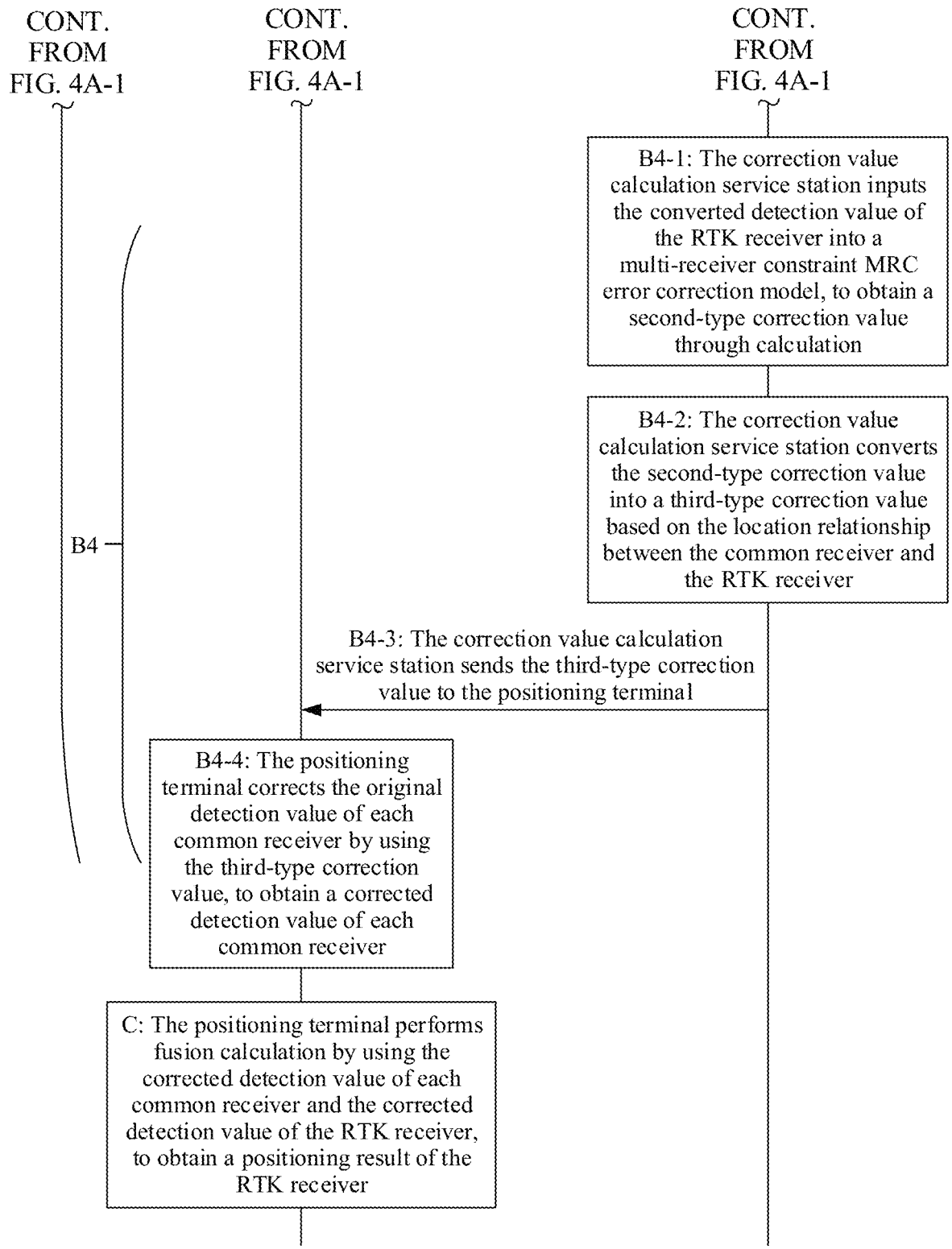

Optionally, in the embodiment corresponding to FIG. 4A-1 and FIG. 4A-2, step B2-2 and step B4-4 are simultaneously performed.

Figures 1, 4B:
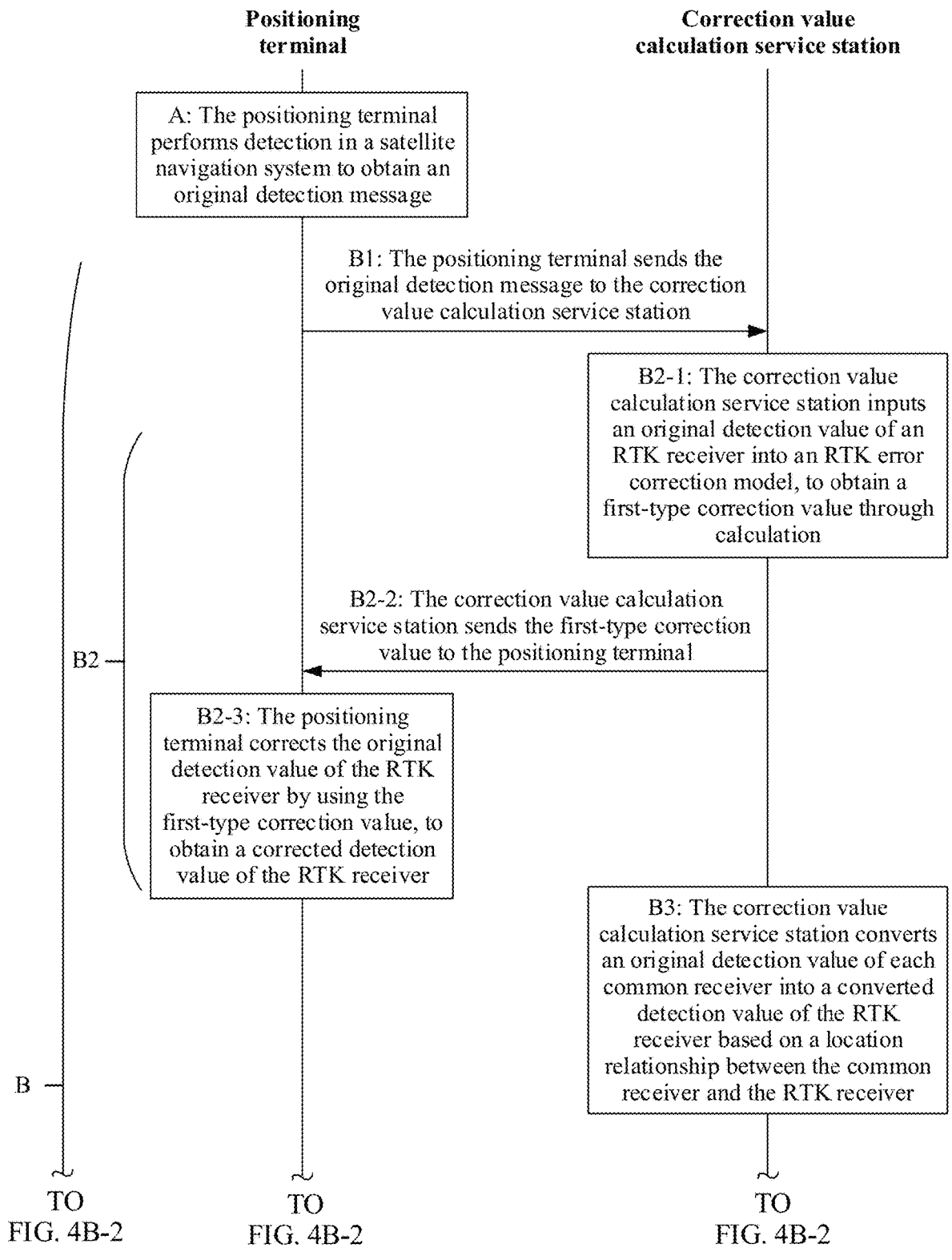
Figures 2, 4B:
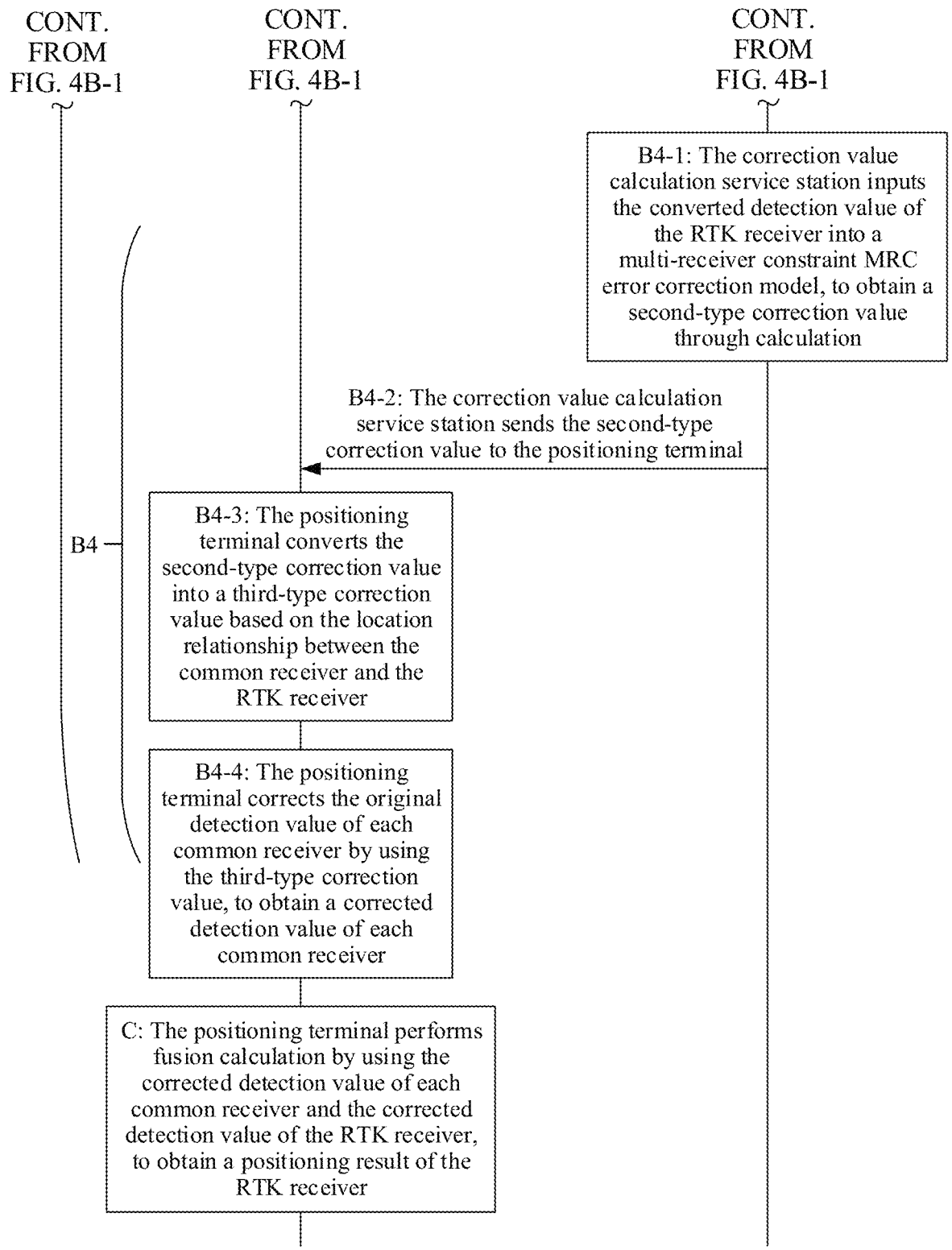
Figures 1, 4C:
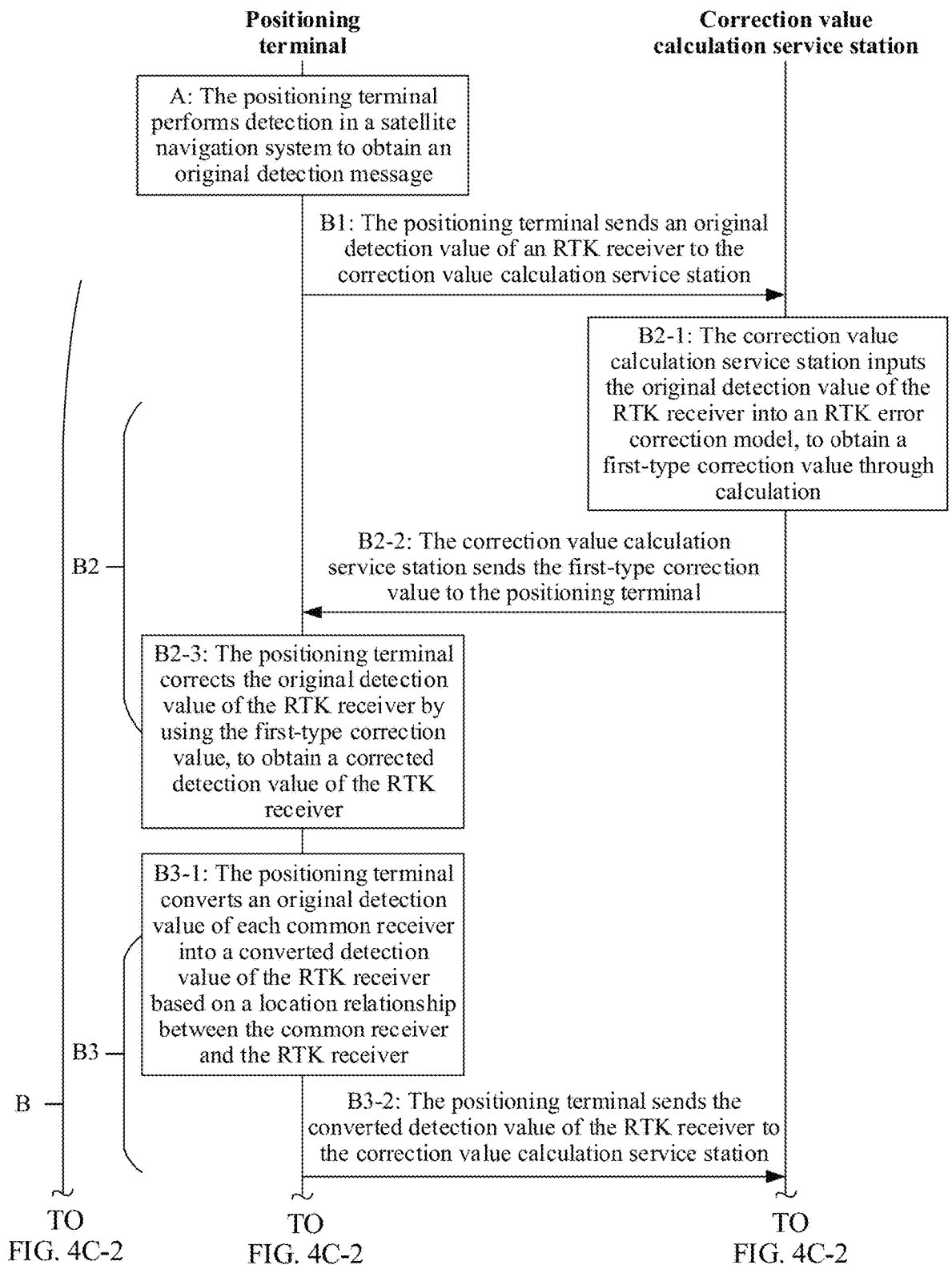
Figures 2, 4C:
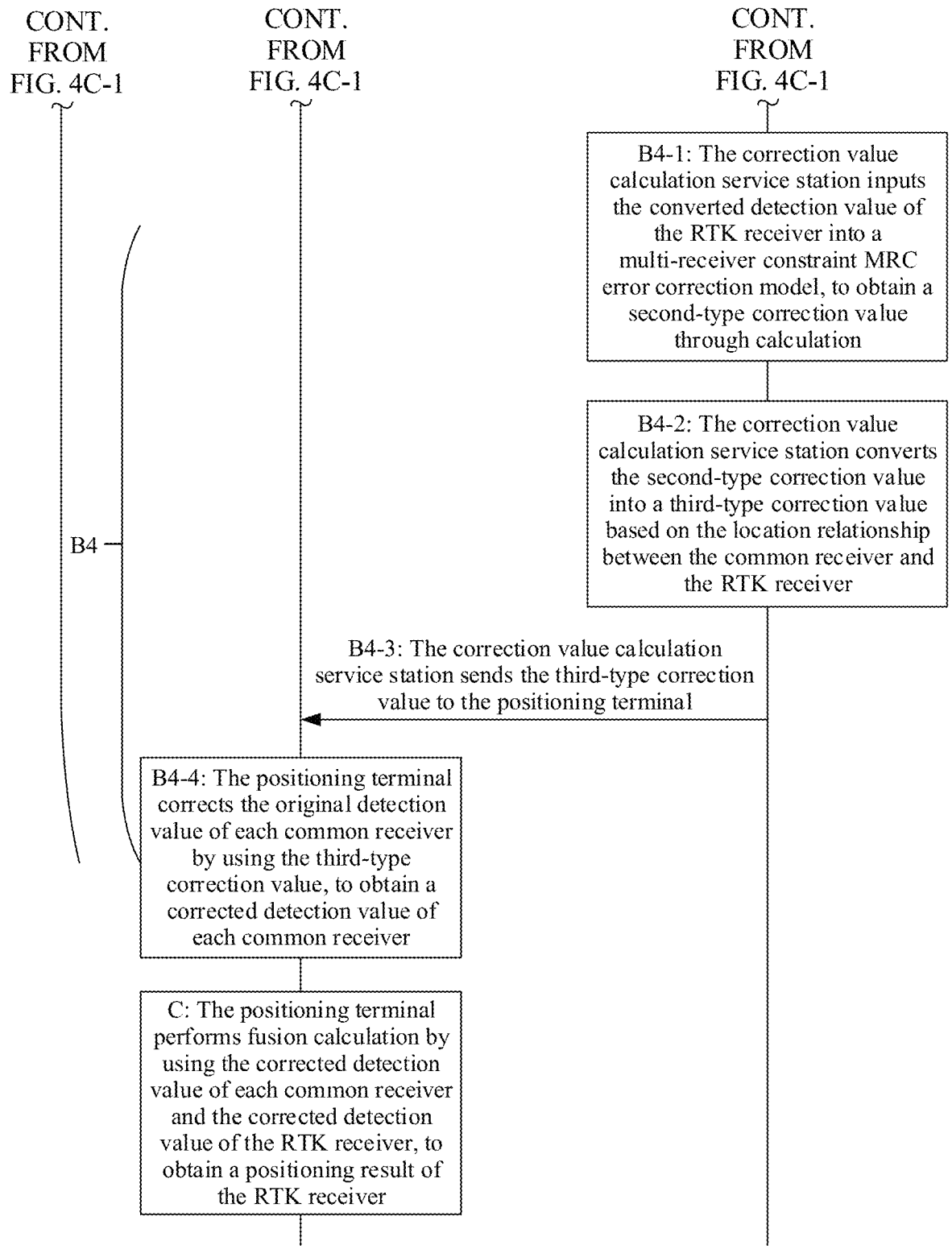
Figures 1, 4D:
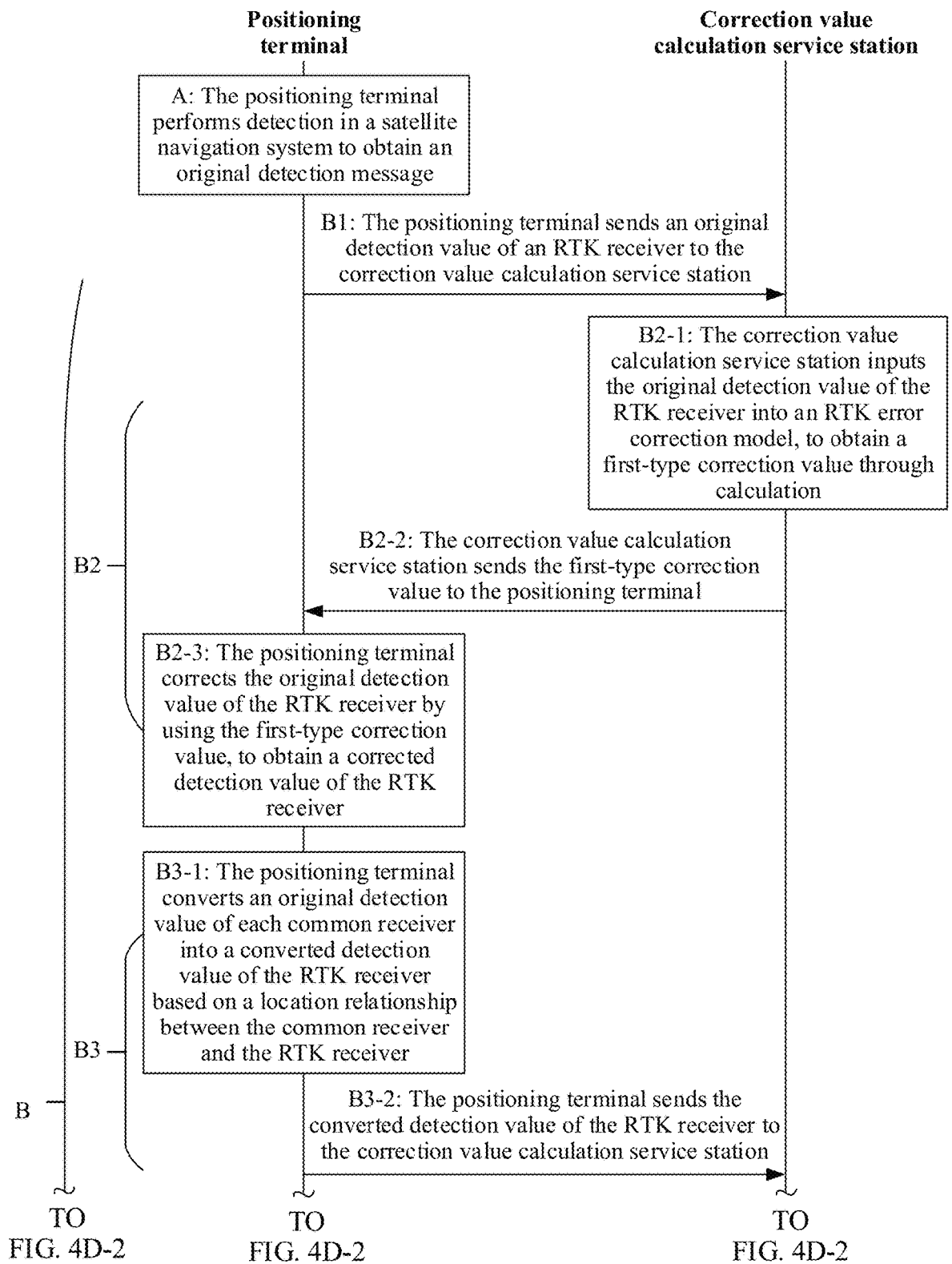
Figures 2, 4D:
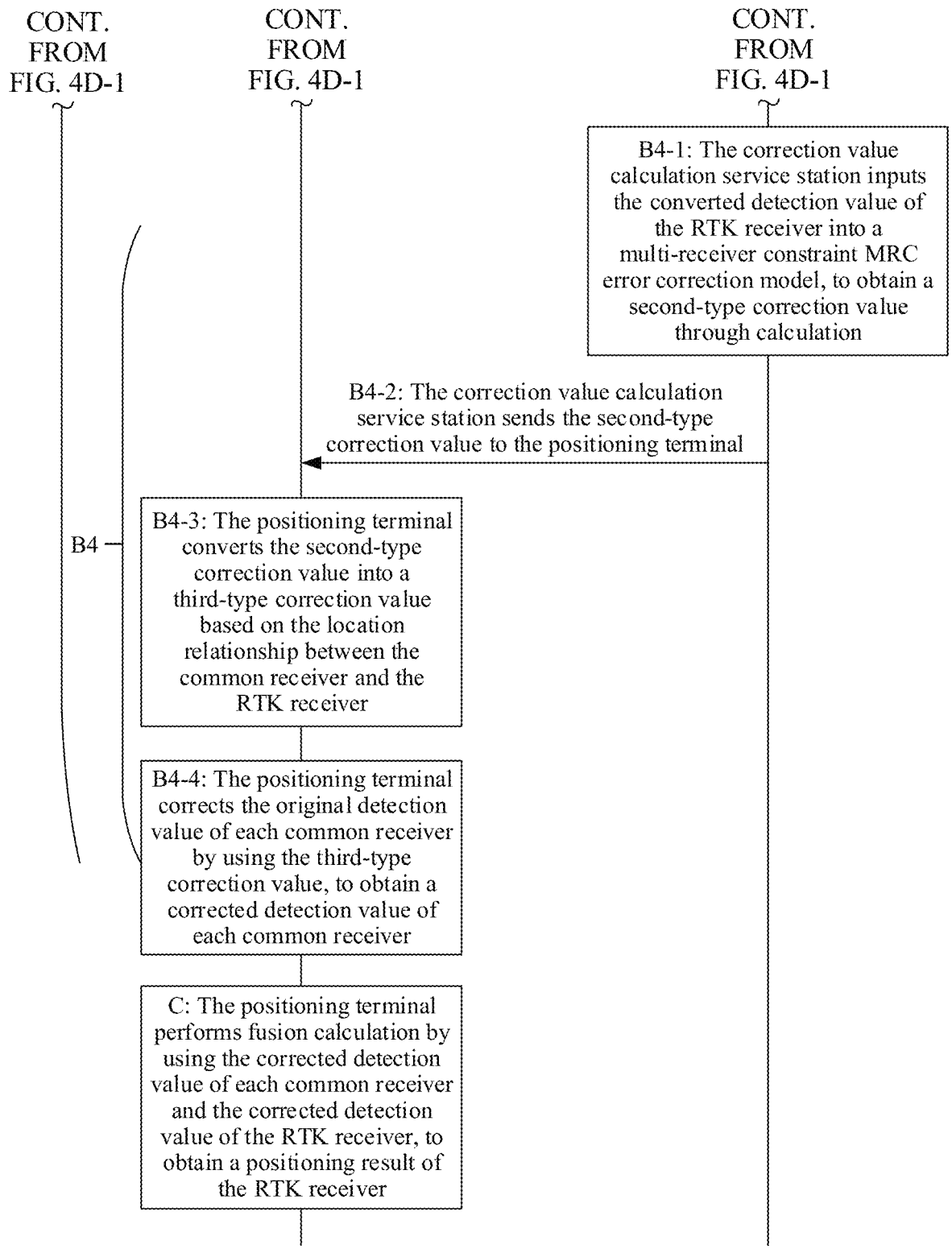

Optionally, in the embodiment corresponding to FIG. 4B-1 and FIG. 4B-2, step B2-2 and step B4-3 are simultaneously performed.

With reference to content of each step in FIG. 4A-1 to FIG. 4B-2, it should be learned that step B2 is performed after step B1 and before step C. It can be further determined that step B4 is performed after step B3 and before step C.

In a second embodiment of this application, as shown in FIG. 4C-1 to FIG. 4D-2, after step A (or after the positioning terminal obtains the original detection message), the positioning method further includes the following steps.

B1: The positioning terminal sends the original detection value of the RTK receiver to the correction value calculation service station.

B3-1: The positioning terminal converts the original detection value of each common receiver into a converted detection value of the RTK receiver based on a location relationship between the common receiver and the RTK receiver.

B3-2: The positioning terminal sends the converted detection value of the RTK receiver to the correction value calculation service station.

It is easy to learn that, in this embodiment, the positioning terminal reports the original detection value of the RTK receiver and the converted detection value of the RTK receiver to the correction value calculation service station. Similar to the foregoing embodiment, in this embodiment, the positioning terminal also encapsulates the original detection value of the RTK receiver and the converted detection value of the RTK receiver into a packet, and reports the packet to the correction value calculation service station, to request a correction message. Correspondingly, the correction value calculation service station also receives packets of a same format.

It should be noted that, a difference between a packet header in this embodiment and the packet header in the foregoing embodiment lies in that, in this embodiment, the packet header includes a field used to indicate the converted detection value of the RTK receiver, instead of a field used to indicate the original detection value of each common receiver. In addition, other fields included in the packet header in the foregoing embodiment may be included in the packet header described in this embodiment, for example, a field used to indicate a number of the correction value calculation service station, a field used to indicate the quantity of receivers included in the positioning terminal, and a field used to indicate the original detection value of the RTK receiver.

It is known that the original detection value of each common receiver includes the pseudorange between the common receiver and each satellite detected by the common receiver. It should be explained that a converted detection value of the RTK receiver includes a pseudorange between the RTK receiver and each satellite detected by a corresponding common receiver. For example, an original detection value of a common receiver 1 includes a pseudorange between the common receiver 1 and each of N1 satellites detected by the common receiver 1. A converted detection value of the RTK receiver corresponding to the original detection value of the common receiver 1 includes a pseudorange between the RTK receiver and each of the N1 satellites detected by the common receiver 1. Therefore, when the positioning terminal includes N common receivers, if the common receiver 1 detects the N1 satellites, a common receiver 2 detects N2 satellites, . . . , and a common receiver N detects Nn satellites, all converted detection values of the RTK receiver that are sent by the positioning terminal to the correction value calculation service station should include N1+N2+ . . . +Nn pseudoranges.

As shown in FIG. 4C-1 to FIG. 4D-2, in addition to step B1 and step B3, step B2 and step B4 are further included. However, in the embodiments corresponding to FIG. 4C-1 to FIG. 4D-2, for a limitation on step B2, refer to the foregoing limitation on step B2 in FIG. 4A-1 to FIG. 4B-2. For a limitation on step B4, refer to the foregoing limitation on step B4 in FIG. 4A-1 to FIG. 4B-2. Details are not described herein again. Herein, step B1 and step B3 need to be explained. As shown in FIG. 4C-1 to FIG. 4D-2, step B3 includes step B3-1 and step B3-2. It should be learned that step B2 is performed after step B1 and before step C, and step B4 is performed between step B3 and step C. This can be determined based on a logical relationship between related steps. Further, step B3-1 is performed before step B3-2. This can also be determined based on a logical relationship between the two steps. However, a sequence of step B2 and step B3 is not specially limited. Further, a sequence of step 1 and step 3 is not specially limited. Step B1 and step B3-1 may be simultaneously performed, or may not be simultaneously performed. However, if the positioning terminal encapsulates the original detection value of the RTK receiver and the converted detection value of the RTK receiver into a packet, and reports the packet to the correction value calculation service station, it should be learned that step B1 and step B3-2 are simultaneously performed, and both step B2 and step B4 are performed after the packet is received.

By comparing the first embodiment and the second embodiment of this application, it is easy to learn that a difference between the first embodiment and the second embodiment lies in that execution bodies for converting the original detection value of each common receiver into the converted detection value of the RTK receiver are different. In the first embodiment, the execution body is the correction value calculation service station, and in the second embodiment, the execution body is the positioning terminal.

Step B2-1: The correction value calculation service station inputs the original detection value of the RTK receiver into an RTK error correction model, to obtain a first-type correction value through calculation.

Step B2-3: The positioning terminal corrects the original detection value of the RTK receiver by using the first-type correction value, to obtain the corrected detection value of the RTK receiver.

It should be noted that before step B2-1, the correction value calculation service station needs to receive the original detection value of the RTK receiver. Specifically, as shown in FIG. 4A-1 to FIG. 4B-2, after the positioning terminal reports the original detection message to the correction value calculation service station (step B1), because the original detection message includes the original detection value of the RTK receiver, the correction value calculation service station may obtain the original detection value of the RTK receiver from the original detection message.

Optionally, as shown in FIG. 4C-1 to FIG. 4D-2, after the positioning terminal reports the original detection value of the RTK receiver to the correction value calculation service station (step B1), the correction value calculation service station obtains the original detection value of the RTK receiver.

It should be noted that, as shown in FIG. 4A-1 to FIG. 4D-2, after step B2-1 and before step B2-3, the positioning method in this embodiment further includes: The correction value calculation service station sends the first-type correction value to the positioning terminal (step B2-2).

It should be noted that a quantity of correction values included in the first-type correction value is equal to a quantity of carriers or pseudoranges (or a quantity of satellites detected by the RTK receiver) included in the original detection value of the RTK receiver, and the correction values included in the first-type correction value one-to-one correspond to the carriers or pseudoranges included in the original detection value of the RTK receiver. Assuming that the RTK receiver detects M satellites, the original detection value of the RTK receiver includes a carrier or pseudorange between the RTK receiver and each of the M satellites. Therefore, the original detection value of the RTK receiver includes M carriers or pseudoranges. Correspondingly, the first-type correction value includes M correction values, and the M correction values one-to-one correspond to the M carriers or pseudoranges.

Step B4-1: The correction value calculation service station inputs the converted detection value of the RTK receiver into an MRC error correction model, to obtain a second-type correction value through calculation.

Step B4-4: The positioning terminal corrects the original detection value of each common receiver by using a third-type correction value, to obtain a corrected detection value of each common receiver.

In a third embodiment of this application, as shown in FIG. 4A-1 to FIG. 4B-2, before step B4-1, the positioning method further includes the following step.

Step B3: The correction value calculation service station converts the original detection value of each common receiver into the converted detection value of the RTK receiver based on a location relationship between the common receiver and the RTK receiver.

In a fourth embodiment of this application, as shown in FIG. 4A-1 to FIG. 4B-2, before step B4-1, the positioning method further includes the following steps.

Step B3-1: The positioning terminal converts the original detection value of each common receiver into the converted detection value of the RTK receiver based on the location relationship between the common receiver and the RTK receiver.

Step B3-2: The positioning terminal sends the converted detection value of the RTK receiver to the correction value calculation service station.

A difference between the third embodiment and the fourth embodiment lies in that an execution body for converting the original detection value of each common receiver into the converted detection value of the RTK receiver is the correction value calculation service station or the positioning terminal. In the third embodiment, the execution body is the correction value calculation service station. In the fourth embodiment, the execution body is the positioning terminal.

In a fifth embodiment of this application, as shown in FIG. 4A-1, FIG. 4A-2, FIG. 4C-1, and FIG. 4C-2, after step B4-1 and before step B4-4, the positioning method further includes the following steps:

Step B4-2: The correction value calculation service station converts the second-type correction value into the third-type correction value based on the location relationship between the common receiver and the RTK receiver.

Step B4-3: The correction value calculation service station sends the third-type correction value to the positioning terminal.

In a sixth embodiment of this application, as shown in FIG. 4B-1, FIG. 4B-2, FIG. 4D-1, and FIG. 4D-2, after step B4-1 and before step B4-4, the positioning method further includes the following steps:

Step B4-2: The correction value calculation service station sends the second-type correction value to the positioning terminal.

Step B4-3: The positioning terminal converts the second-type correction value into the third-type correction value based on the location relationship between the common receiver and the RTK receiver.

A difference between the fifth embodiment and the sixth embodiment lies in that an execution body for converting the second type of correction value into the third type of correction value is the correction value calculation service station or the positioning terminal. In the fifth embodiment, the execution body is the correction value calculation service station. In the sixth embodiment, the execution body is the positioning terminal.

It should be noted that, in this application, after a converted detection value of the RTK receiver corresponding to the original detection value of each common receiver is input into the MRC error correction model for calculation, a second-type correction value corresponding to the converted detection value of the RTK receiver can be obtained.

Assuming that the common receiver 1 detects N1 satellites, an original detection value of the common receiver 1 is a pseudorange that is between the common receiver 1 and each of the N1 satellites and that is detected by the common receiver 1. It can be learned that the original detection value of the common receiver 1 includes N1 pseudoranges detected by the common receiver 1. Therefore, in a process of converting the original detection value of the common receiver 1 into a converted detection value of the RTK receiver, the N1 pseudoranges detected by the common receiver 1 are converted into the converted detection value of the RTK receiver. It should be noted that the converted detection value of the RTK receiver corresponding to the original detection value of the common receiver 1 includes N1 converted values, and the N1 converted values one-to-one correspond to the N1 pseudoranges detected by the common receiver 1.

Further, after the converted detection value of the RTK receiver corresponding to the original detection value of the common receiver 1 is obtained, and the converted detection value of the RTK receiver corresponding to the original detection value of the common receiver 1 is input into the MRC error correction model, a corresponding second-type correction value is obtained. It should be explained that the corresponding second-type correction value also includes N1 correction values, and the N1 correction values one-to-one correspond to the N1 converted values. Then, the corresponding second-type correction value is converted into a corresponding third-type correction value based on a location relationship between the common receiver 1 and the RTK receiver (or a relationship between coordinates of the common receiver 1 and coordinates of the RTK receiver). It should be learned that the corresponding third-type correction value herein is a third-type correction value corresponding to the original detection value of the common receiver 1. It should be noted that the corresponding third-type correction value also includes N1 correction values, and the N1 correction values one-to-one correspond to the N1 pseudoranges detected by the common receiver 1. In addition, each correction value is used by the positioning terminal to correct a corresponding pseudorange in the N1 pseudoranges detected by the common receiver 1.

It should be explained that each of the N common receivers included in the positioning terminal complies with the foregoing related regulation for the common receiver 1. Specifically, when a common receiver N1 detects N1 satellites, an original detection value of the common receiver 1 includes N1 detection values, and the N1 detection values one-to-one correspond to the N1 satellites detected by the common receiver N1. A converted detection value of the RTK receiver corresponding to the original detection value of the common receiver N1 (or referred to as a "corresponding converted detection value of the RTK receiver" for short) also includes N1 converted values, and the N1 converted values one-to-one correspond to the N1 pseudoranges. A second-type correction value corresponding to the corresponding converted detection value of the RTK receiver (or referred to as a "corresponding second-type correction value" for short) also includes N1 correction values, and the N1 correction values included in the corresponding second-type correction value one-to-one correspond to the N1 converted values. Further, a third-type correction value corresponding to the corresponding second-type correction value (or referred to as a "corresponding third-type correction value" for short) also includes N1 correction values, and the N1 correction values included in the corresponding third-type correction value one-to-one correspond to the N1 correction values included in the corresponding second-type correction value. It is easy to learn from the foregoing explanation that the N1 correction values included in the corresponding third-type correction value one-to-one correspond to the N1 detection values included in the original detection value of the common receiver 1, and each correction value is used to correct a corresponding detection value, to obtain a detection value that has undergone correction (or referred to as a "corrected detection value").

It may be learned from the foregoing description that the detection value included in the original detection value of the common receiver 1 may be a pseudorange. Correspondingly, each correction value included in the corresponding third-type correction value is used to correct a corresponding pseudorange, to obtain a corrected pseudorange.

As shown in FIG. 4A-1, FIG. 4A-2, FIG. 4C-1, and FIG. 4C-2, when returning the first-type correction value and the third-type correction value to the positioning terminal, the correction value calculation service station may return the first-type correction value and the third-type correction value to the positioning terminal in a form of a packet. Similarly, as shown in FIG. 4B-1, FIG. 4B-2, FIG. 4D-1, and FIG. 4D-2, when returning the first-type correction value and the second-type correction value to the positioning terminal, the correction value calculation service station may also return the first-type correction value and the second-type correction value to the positioning terminal in a form of a packet. It should be noted that the packet may include at least fields used to indicate the following information: a number of each receiver, a number of a satellite detected by each receiver, and a correction value of each detection value included in an original detection value of each receiver. It should be learned that there is a correspondence between the number of the receiver, the number of the satellite, and the correction value of the detection value.

As shown in FIG. 3, step B2-1 and step B2-3 are in step B2, and step B4-1 and step B4-4 are in step B4. It should be noted that, step B2-1 and step B2-3 are performed in sequence. Step B2-1 is performed before step B2-3. This can also be determined based on a logical relationship between the two steps.

Similarly, step B4-1 is performed before step B4-4. However, step B2 and step B4 each include a plurality of steps, and there is no specific sequence between the steps. For example, step B2-1 may be performed before or after step B4-1.

In this application, the correction value calculation service station may be a reference station, a data server, a cloud server, or the like.

In a seventh embodiment of this application, the correction value calculation service station is a reference station. Therefore, before the positioning method in this application is performed, the RTK error correction model (or the MRC error correction model) needs to be preconstructed on the reference station. Because the reference station can interact with only a positioning terminal located in a coverage of the reference station, the RTK error correction model (or the MRC error correction model) constructed on the reference station is a small-range model.

In an eighth embodiment of this application, the correction value calculation service station is a data server. Generally, there are three to five reference stations in a coverage of the data server. It should be noted that the wide-area RTK error calculation model is obtained through calculation based on an RTK error calculation model of each reference station in the coverage of the data server after the data server obtains the RTK error calculation model of each reference station. Similarly, the wide-area MRC error calculation model is obtained through calculation based on an MRC error calculation model of each reference station in the coverage of the data server after the data server obtains the MRC error calculation model of each reference station.

It should be learned that when the positioning terminal sends a message to the data server, and when the data server delivers a message to the positioning terminal, the message may pass through a data center, a switch, or another relay communications device. That is, during a message exchange between the positioning terminal and the data server, an existing communications network and communications manner may be still used.

In a ninth embodiment of this application, the correction value calculation service station is a cloud server. The cloud server has a wide coverage. It should be noted that the unified RTK error calculation model is obtained through calculation based on a wide-area RTK error calculation model of each data server in the coverage of the cloud server after the cloud server obtains the wide-area RTK error calculation model of each data server. Similarly, the unified MRC error calculation model is obtained through calculation based on a wide-area MRC error calculation model of each data server in the coverage of the cloud server after the cloud server obtains the wide-area MRC error calculation model of each data server. It should be learned that during a message exchange between the positioning terminal and the cloud server, an existing communications network and communications manner may be still used.

Step C: The positioning terminal performs fusion calculation by using the corrected detection value of each common receiver and the corrected detection value of the RTK receiver, to obtain a positioning result of the RTK receiver.

As shown in FIG. 4A-1 to FIG. 4D-2, after step B2-3 and step B4-4, or after the positioning terminal obtains the corrected detection value of the RTK receiver and the corrected detection value of each common receiver, the positioning terminal performs step C.

It should be noted that, an RTK positioning algorithm-based resolved location (which may be referred to as a resolved location of the RTK receiver for short) of the RTK receiver can be obtained by using the corrected detection value of the RTK receiver according to an RTK positioning algorithm.

Correspondingly, an MRC positioning algorithm-based resolved location (which may be referred to as a resolved location of each common receiver for short) of each common receiver can be obtained by using the corrected detection value of each common receiver according to an MRC positioning algorithm. After the MRC positioning algorithm-based resolved location of each common receiver is obtained, an MRC positioning algorithm-based resolved location of the geometric center of the N-gon further needs to be obtained based on the MRC positioning algorithm-based resolved location of each common receiver. It should be noted that, in this application, because the RTK receiver is located at the geometric center of the regular N-gon, obtaining the MRC positioning algorithm-based resolved location of the geometric center of the regular N-gon is equivalent to obtaining an MRC positioning algorithm-based resolved location of the RTK receiver.

Then, fusion calculation is performed on the RTK positioning algorithm-based resolved location of the RTK receiver and the MRC positioning algorithm-based resolved location of the RTK receiver by using a probability model, to obtain a high-accuracy positioning result of the RTK receiver.

It should be noted that the fusion calculation performed by using the probability model specifically includes the following two aspects. In one aspect, as shown in FIG. 5A, a probability distribution P1 of a location of the RTK receiver is constructed by using a solution type (a fixed solution, a free solution, or the like) of the RTK positioning algorithm-based resolved location of the RTK receiver, a horizontal dilution of precision (Horizontal Dilution of Precision, HDOP), and the quantity of satellites detected by the RTK receiver. In the other aspect, as shown in FIG. 5B, a probability distribution P2 of a location of the geometric center of the regular N-gon is obtained by using a similarity degree of the regular N-gon by comparing an actual geometric topology of the regular N-gon with a geometric topology that is of the regular N-gon and that is obtained through calculation.

It has been learned that the N common receivers are located at the N vertices of the regular N-gon. The regular N-gon herein is determined based on actual locations of the N common receivers, and therefore may be an actual regular N-gon. It has been learned that the MRC positioning algorithm-based resolved location of each common receiver can be obtained by using the corrected detection value of each common receiver according to the MRC positioning algorithm. It should be noted that the N common receivers determined through calculation are located at the N vertices of the regular N-gon obtained through calculation. Because a location of each common receiver determined through calculation is different from an actual location of a corresponding common receiver, the geometric topology of the regular N-gon obtained through calculation is also different from the actual geometric topology of the regular N-gon.

It should be explained that when detecting a satellite, the RTK receiver can determine, based on a GNSS epoch, distribution statuses of a plurality of detected satellites. The positioning terminal can obtain the HDOP through calculation based on distribution of the plurality of satellites.

Figure 5C:
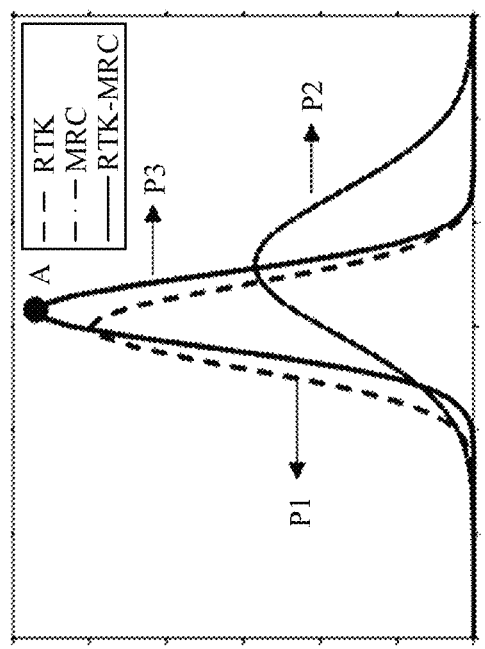
FIG. 5C shows a probability distribution P3 of a location of an RTK receiver in a positioning method according to this application.
Figure 5A:
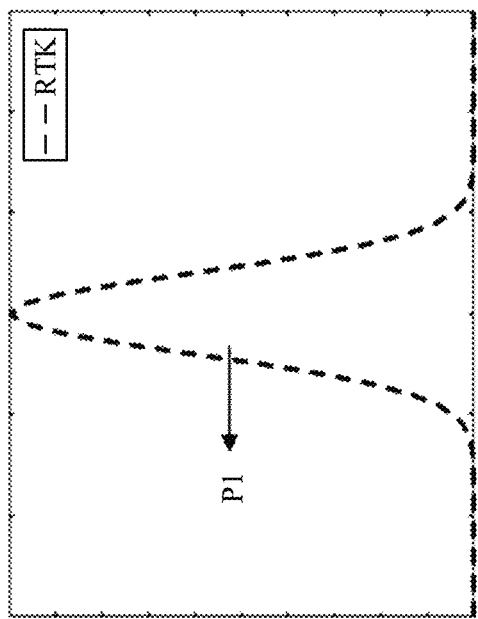
FIG. 5A shows a probability distribution P1 of a location of an RTK receiver in a positioning method according to this application.
Figure 5B:
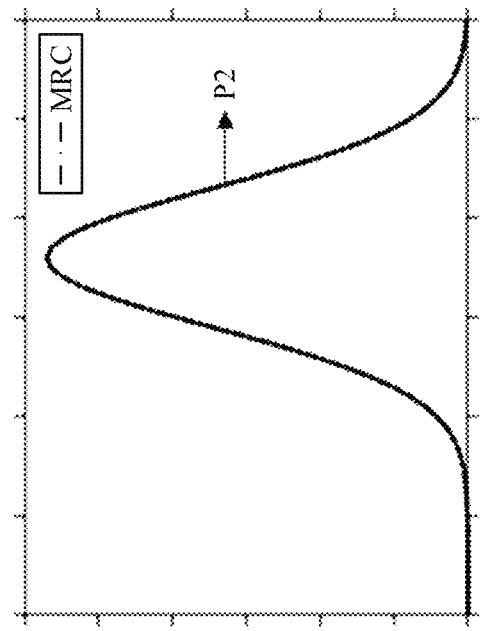
FIG. 5B shows a probability distribution P2 of a location of an RTK receiver in a positioning method according to this application.

As shown in FIG. 5C, a joint probability distribution P3 is obtained by using P1 and P2. A maximum solution in the joint probability distribution P3 is the positioning result of the RTK receiver determined according to the positioning method provided in this application (for example, a mark point A on a curve representing P3 in FIG. 5C is used to represent the positioning result of the RTK receiver determined according to the positioning method provided in this application).

It should be noted that the "by using a similarity degree of a regular N-gon" means that a ratio of an overlapping area of the actual regular N-gon and the regular N-gon obtained through calculation to an area of the actual regular N-gon may be used (that is, an area relationship is used). It should be noted that a relationship between an actual side length of the regular N-gon and a side length of the regular N-gon obtained through calculation may be further used, a relationship between a vertex angle of the actual regular N-gon and a vertex angle of the regular N-gon obtained through calculation is used, or the like.

It should be learned that before the foregoing high-accuracy positioning method is performed, the RTK error correction model and the MRC error correction model need to be separately preconstructed in the correction value calculation service station according to a big data technology. The two error correction models are both constructed by using a regression equation (or constructed according to a regression technology).

Specifically, the MRC error correction model is constructed according to a regression equation $y=f(x)$, where x is the original detection value of the RTK receiver, y is the second-type correction value, and $f(\bullet)$ is a mapping function from x to y. Specifically, $f(\bullet)$ is obtained through training after a neural network is constructed and a pseudorange between each common receiver and each satellite detected by the corresponding common receiver is input into the neural network.

Optionally, $f(x)$ is specifically $wx+b$, that is, the regression equation is $y=wx+b$. The regression equation may be determined by using the following method.

It should be noted that a pseudorange between a common receiver k and a satellite i detected by the common receiver k may be obtained according to the following pseudorange calculation equation (1). The common receiver k is any one of the N common receivers in this application, and the satellite i is any one of a plurality of satellites detected by the common receiver k.

$$P_k^i=\rho_k^i+d\rho_k^i+c(dt^i-dT_k)+d_{ion,k}^i+d_{trop,k}^i+d_{mp,k}^i+\varepsilon_P, \quad (1)$$

$P_k^i$ represents an actual distance between the satellite i and the receiver K, $\rho_k^i$ represents a pseudorange between the satellite i and the receiver K, $d\rho_k^i$ represents an orbital error between the satellite i and the receiver K, c represents a speed of light in vacuum, $dt^i$ represents a clock difference of the satellite i, $dT_k$ represents a clock difference of the receiver k, $d_{ion,k}^i$ represents a delay of a ranging code propagated from the satellite i to the receiver k resulting from interference of the ionosphere to an electromagnetic wave propagated from the satellite i to the receiver k, $d_{trop,k}^i$ represents a delay of the ranging code propagated from the satellite i to the receiver k resulting from interference of the troposphere to the electromagnetic wave propagated from the satellite i to the receiver k, $d_{mp,k}^i$ represents an error caused by a multipath effect when the ranging code is propagated from the satellite i to the receiver k, and $\varepsilon_P$ represents detection noise of the receiver K.

$$\Delta\rho_k^i=d\rho_k^i+c(dt^i-dT_k)+d_{ion,k}^i+d_{trop}^i+d_{mp,k}^i+\varepsilon_P, \quad (2)$$

The equation (2) is substituted into the equation (1), and the equation (1) is transformed into the following equation (3):

$$\rho_k^i=P_k^i-\Delta\rho_k^i, \quad (3)$$

Coordinates of the satellite i are $(x^i, y^i, z^i)$, and coordinates of the common receiver K are $(x_k, y_k, z_k)$.

The equation (3) may be transformed into the following equation (4):

$$\rho_k^i+\Delta\rho_k^i=\sqrt{(x^i-x_k)^2+(y^i-y_k)^2+(z^i-z_k)^2} \quad (4)$$

Linearization is performed on $\sqrt{(x^i-x_k)^2+(y^i-y_k)^2+(z^i-z_k)^2}$, to obtain a linear expression form of the equation (4). The equation (4) in the linear expression form is transformed or arranged according to the foregoing form of the regression equation $y=wx+b$, to obtain a linear pseudorange regression equation (that is, a regression equation used to construct the MRC error correction model).

After the pseudorange regression equation is obtained, a neural network is constructed, the original detection value of each common receiver is input to the neural network, and the parameter w in the pseudorange regression equation is calculated according to a backpropagation algorithm. After the parameter w is determined, the parameter w is substituted into the pseudorange regression equation to obtain the MRC error correction model. Then, the original detection value of each common receiver is input into the MRC error correction model, to obtain the first-type correction value corresponding to the original detection value of the common receiver through resolving. It should be noted that the first-type correction value is a value of the parameter b in the pseudorange regression equation.

Similarly, the RTK error correction model is also constructed according to the regression equation $y=f(x)$. A difference lies in that x is the original detection value of the RTK receiver, y is the first-type correction value, and $f(\bullet)$ is a mapping function from x to y. Specifically, $f(\bullet)$ is obtained through training after a neural network is constructed, and the carrier (or the pseudorange) between the RTK receiver and each satellite detected by the RTK receiver is input into the neural network.

Optionally, $f(x)$ may be $wx+b$, that is, the regression equation is $y=wx+b$. It should be noted that a carrier regression equation may be obtained according to a carrier calculation equation by using the method for obtaining the pseudorange regression equation according to the pseudorange calculation equation. It should be learned that the carrier regression equation is a regression equation of a $y=wx+b$ type required for constructing the RTK error correction model.

After the carrier regression equation is obtained, a neural network is constructed, the original detection value of the RTK receiver is input to the neural network, and the parameter w in the carrier regression equation is calculated according to a backpropagation algorithm. After the parameter w is determined, the parameter w is substituted into the carrier regression equation to obtain the RTK error correction model. Then, the original detection value of the RTK receiver is input into the RTK error correction model, to obtain the first-type correction value through resolving. It should be noted that the first-type correction value is a value of the parameter b in the carrier regression equation.

It is learned from the foregoing description that the original detection value of the RTK receiver includes a carrier. However, when the carrier cannot be detected, the original detection value of the RTK receiver includes a pseudorange. In this case, the determined pseudorange regression equation may be used, a neural network is constructed, the original detection value of the RTK receiver is input to the neural network, and the parameter w in the pseudorange regression equation is calculated according to a backpropagation algorithm. After the parameter w is determined, the parameter w is substituted into the pseudorange regression equation to obtain the RTK error correction model. Then, the original detection value of the RTK receiver is input into the RTK error correction model, to obtain the first-type correction value through resolving. It should be noted that the first-type correction value is a value of the parameter b in the carrier regression equation.

Figure 6:
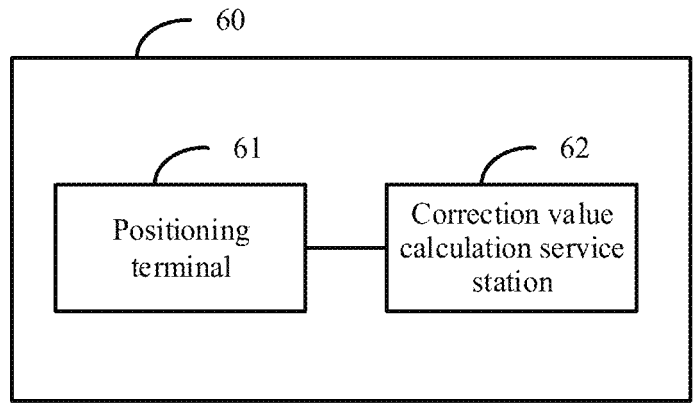
FIG. 6 is a schematic diagram of a positioning system according to this application.

Second Part:

As shown in FIG. 6, this application provides a positioning system 60. The positioning system 60 includes a positioning terminal 61 and a correction value calculation service station 62. It should be noted that the positioning terminal 61 is configured to perform operations performed by the positioning terminal in the method embodiments described in the first part. Correspondingly, the correction value calculation service station 62 is configured to perform operations performed by the correction value calculation service station in the method embodiments described in the first part. In the first part, the operations performed by the positioning terminal and the operations performed by the correction value calculation service station are described in detail. Therefore, in the positioning system 60, for operations performed by the positioning terminal 61 and the correction value calculation service station 62, refer to related descriptions in the first part. For brevity, the repeated content is not described herein again.

Figure 7:
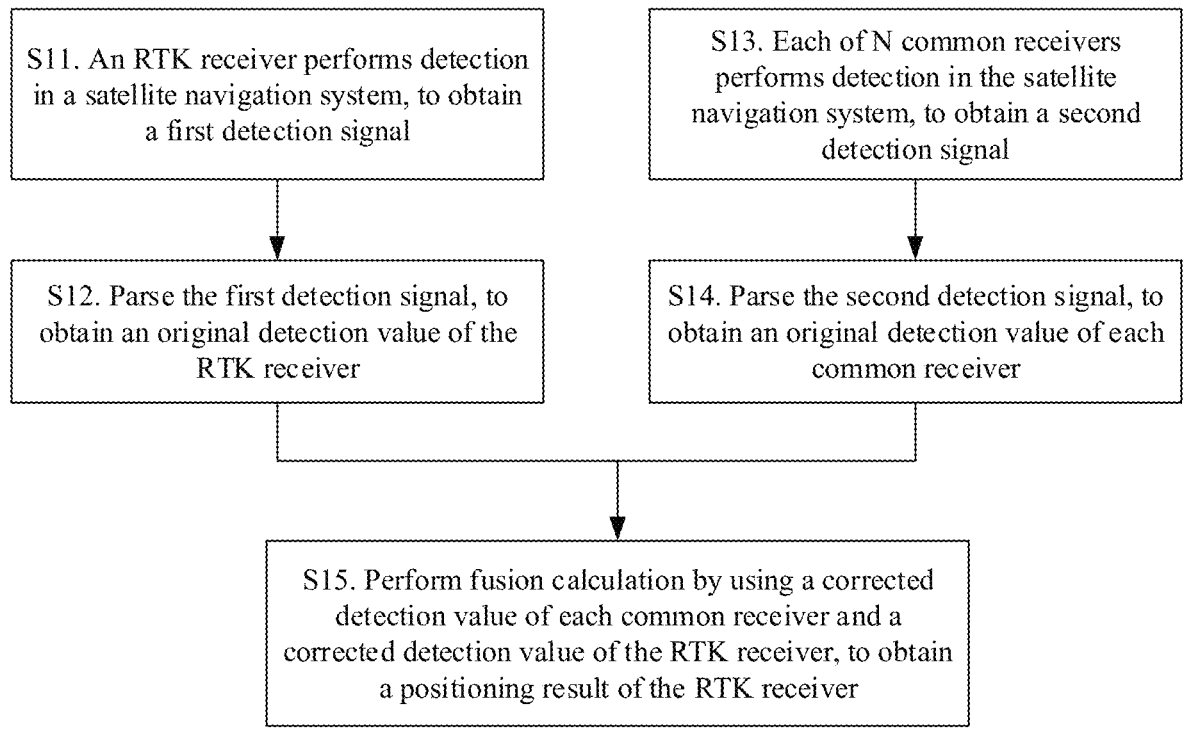
FIG. 7 is a schematic flowchart of another positioning method according to this application.

Third Part:

FIG. 7 is a flowchart of a positioning method according to this application. The positioning method is performed by a positioning terminal. In an embodiment of this application, the positioning method includes the following steps.

S11: An RTK receiver performs detection in a satellite navigation system, to obtain a first detection signal.

S12: Parse the first detection signal, to obtain an original detection value of the RTK receiver.

It should be noted that, the RTK receiver has at least a capability of performing an RTK positioning algorithm, and there is one RTK receiver. The original detection value of the RTK receiver includes a carrier between the RTK receiver and each of a plurality of satellites that are located in the satellite navigation system and that are detected by the RTK receiver.

When the RTK receiver fails to detect a carrier, the original detection value of the RTK receiver includes a pseudorange between the RTK receiver and each of the plurality of satellites that are located in the satellite navigation system and that are detected by the RTK receiver.

S13: Each of N common receivers performs detection in the satellite navigation system, to obtain a second detection signal.

It should be noted that N is an integer greater than or equal to 3, the N common receivers are located at N vertices of a regular N-gon, the RTK receiver is located at a geometric center of the regular N-gon, and the common receiver has at least a capability of measuring a pseudorange between the common receiver and a satellite that is located in the satellite navigation system and that is detected by the common receiver.

S14: Parse the second detection signal, to obtain an original detection value of each common receiver.

The original detection value of the common receiver includes a pseudorange between the common receiver and each of a plurality of satellites that are located in the satellite navigation system and that are detected by the common receiver.

S15: Perform fusion calculation by using a corrected detection value of each common receiver and a corrected detection value of the RTK receiver, to obtain a positioning result of the RTK receiver.

It should be noted that the corrected detection value of the RTK receiver is obtained by correcting the original detection value of the RTK receiver by using a first-type correction value, and the first-type correction value is a correction value generated by a correction value calculation service station for the original detection value of the RTK receiver.

Further, the corrected detection value of each common receiver is obtained by correcting the original detection value of each common receiver by using a third-type correction value. The third-type correction value is obtained by converting a second-type correction value based on a location relationship between the common receiver and the RTK receiver. The second-type correction value is a correction value generated by the correction value calculation service station for a converted detection value of the RTK receiver. The converted detection value of the RTK receiver is obtained by converting the original detection value of each common receiver based on the location relationship between the common receiver and the RTK receiver.

It should be learned that in addition to the foregoing steps, the positioning method provided in the third part may further include operations performed by the positioning terminal in the embodiments of the first part. Therefore, the positioning method performed by the positioning terminal in the third part may be understood with reference to related descriptions in the first part. For brevity, the repeated content is not described herein again.

Fourth Part:

FIG. 8 is a schematic structural diagram of a positioning terminal 80 according to this application. The positioning terminal 80 includes a processor 81, one K receiver 82, and N common receivers 83. It should be noted that the positioning terminal described in this part is configured to perform the positioning method described in the third part.

Specifically, the RTK receiver 82 is configured to perform detection in a satellite navigation system, to obtain a first detection signal.

The processor 81 is configured to parse the first detection signal, to obtain an original detection value of the RTK receiver 82.

The original detection value of the RTK receiver 82 includes a carrier (or a pseudorange) between the RTK receiver 82 and each of a plurality of satellites that are located in the satellite navigation system and that are detected by the RTK receiver 82.

Each of the N common receivers 83 is configured to perform detection in the satellite navigation system, to obtain a second detection signal.

The processor 81 is configured to parse the second detection signal, to obtain an original detection value of each common receiver 83.

It should be noted that the original detection value of the common receiver 83 includes a pseudorange between the common receiver 83 and each of a plurality of satellites that are located in the satellite navigation system and that are detected by the common receiver 83.

The processor 81 is further configured to perform fusion calculation by using a corrected detection value of each common receiver 83 and a corrected detection value of the RTK receiver 82, to obtain a positioning result of the RTK receiver 82.

It should be noted that the corrected detection value of each common receiver 83 is obtained by correcting the original detection value of each common receiver 83 by using a third-type correction value. The third-type correction value is obtained by converting a second-type correction value based on a location relationship between each common receiver 82 and the RTK receiver 83. The second-type correction value is a correction value generated by a correction value calculation service station for a converted detection value of the RTK receiver 82, and the converted detection value of the RTK receiver 82 is obtained by converting the original detection value of each common receiver 83 based on the location relationship between the common receiver 83 and the RTK receiver 82.

In addition, the corrected detection value of the RTK receiver 82 is obtained by correcting the original detection value of the RTK receiver 82 by using a first-type correction value. The first-type correction value is a correction value generated by the correction value calculation service station for the original detection value of the RTK receiver 82.

As shown in FIG. 8, the positioning terminal 80 further includes a transceiver 85. It should be noted that the transceiver 85 is configured to send the original detection value of the RTK receiver 82 to the correction value calculation service station, and receive the first-type correction value returned by the correction value calculation service station for the original detection value of the RTK receiver 82. Correspondingly, the processor 81 is configured to correct the original detection value of the RTK receiver 82 by using the first-type correction value, to obtain the corrected detection value of the RTK receiver 82.

In an embodiment of this application, the transceiver 85 is configured to send the original detection value of each common receiver 83 to the correction value calculation service station.

In another embodiment of this application, the processor 81 is configured to convert the original detection value of each common receiver 83 into the converted detection value of the RTK receiver 82 based on the location relationship between the common receiver 83 and the RTK receiver 82. Then, the transceiver 85 is further configured to send the converted detection value of the RTK receiver 82 to the correction value calculation service station.

In still another embodiment of this application, the transceiver 85 is further configured to receive the third-type correction value returned by the correction value calculation service station. Correspondingly, the processor 81 is further configured to correct the original detection value of each common receiver 83 by using the third-type correction value, to obtain the corrected detection value of each common receiver 83.

In still another embodiment of this application, the transceiver 85 is further configured to receive the second-type correction value returned by the correction value calculation service station. Correspondingly, the processor 81 is further configured to convert the second-type correction value into the third-type correction value based on the location relationship between each common receiver 83 and the RTK receiver 82. The processor 81 is further configured to correct the original detection value of each common receiver 83 by using the third-type correction value, to obtain the corrected detection value of each common receiver 83. Further, the processor 81 is further configured to correct the original detection value of each common receiver 83 by using the third-type correction value, to obtain the corrected detection value of each common receiver 83.

In this application, the processor 81 is specifically configured to obtain a resolved location of each common receiver 83 through calculation based on the original detection value of each common receiver 83 according to a multi-receiver constraint MRC positioning algorithm, and obtain a resolved location of the geometric center of the regular N-gon through calculation based on the resolved location of each common receiver 83. The processor 81 is further specifically configured to obtain a resolved location of the RTK receiver 82 through calculation by using the original detection value of the RTK receiver 82 according to an RTK positioning algorithm. Further, the processor 81 is further specifically configured to perform fusion calculation on the resolved location of the geometric center of the regular N-gon and the resolved location of the RTK receiver 82 by using a probability model, to obtain the positioning result of the RTK receiver 82.

It should be noted that, as shown in FIG. 8, the positioning terminal 80 may further include a data interface 84. After obtaining the original detection value of the RTK receiver 82 through parsing, the processor 81 may further report the original detection value of the RTK receiver 82 to the correction value calculation service station through the data interface 84. In the positioning terminal 80 provided in this application, information may be sent to another communications device (for example, the correction value calculation service station) through the data interface 84, or information from another communications device (for example, the correction value calculation service station) may be received through the data interface 84.

It should be learned that for various positioning terminals provided in the fourth part, refer to the positioning terminal described in the embodiments of the first part. In addition, the positioning terminal provided in the fourth part is configured to perform the positioning method described in the third part. Therefore, the positioning terminal described in the fourth part may be understood with reference to related descriptions in the first part and the third part. For brevity, the repeated content is not described herein again.

Fifth Part:

FIG. 9 is a flowchart of another positioning method according to this application. The positioning method is performed by a correction value calculation service station. In an embodiment of this application, the positioning method includes the following steps.

S21: Input an original detection value of a real-time kinematics (RTK) receiver into an RTK error correction model, to obtain a first-type correction value through calculation.

It should be explained that the RTK receiver is located in a positioning terminal and has at least a capability of performing an RTK positioning algorithm. The original detection value of the RTK receiver includes a carrier or a pseudorange between the RTK receiver and each of a plurality of satellites that are located in a satellite navigation system and that are detected by the RTK receiver.

S22: Input a converted detection value of the RTK receiver into a multi-receiver constraint MRC error correction model, to obtain a second-type correction value through calculation, so that the positioning terminal can correct the original detection value of the RTK receiver based on the first-type correction value, to obtain a corrected detection value of the RTK receiver, correct an original detection value of each common receiver based on a third-type correction value, to obtain a corrected detection value of each common receiver, and perform fusion calculation by using the corrected detection value of each common receiver and the corrected detection value of the RTK receiver, to obtain a positioning result of the RTK receiver.

It should be noted that the third-type correction value is obtained by converting the second-type correction value based on a location relationship between the common receiver and the RTK receiver. The converted detection value of the RTK receiver is obtained by converting the original detection value of each of N common receivers based on the location relationship between the common receiver and the RTK receiver. The N common receivers are located in the positioning terminal, and each common receiver has at least a capability of measuring a pseudorange between the common receiver and a satellite that is located in the satellite navigation system and that is detected by the common receiver. N is an integer greater than or equal to 3, the N common receivers are located at N vertices of a regular N-gon, and the RTK receiver is located at a geometric center of the regular N-gon. The original detection value of the common receiver includes a pseudorange between the common receiver and each of a plurality of satellites that are located in the satellite navigation system and that are detected by the common receiver.

It should be noted that in addition to the foregoing steps, the positioning method provided in the fifth part may further include operations performed by the correction value calculation service station in the embodiments of the first part. Therefore, the positioning method performed by the correction value calculation service station in the fifth part may be understood with reference to related descriptions in the first part. Therefore, for another embodiment of the positioning method provided in this application, refer to related limitations in the first part. Details are not described herein again.

Figure 10:
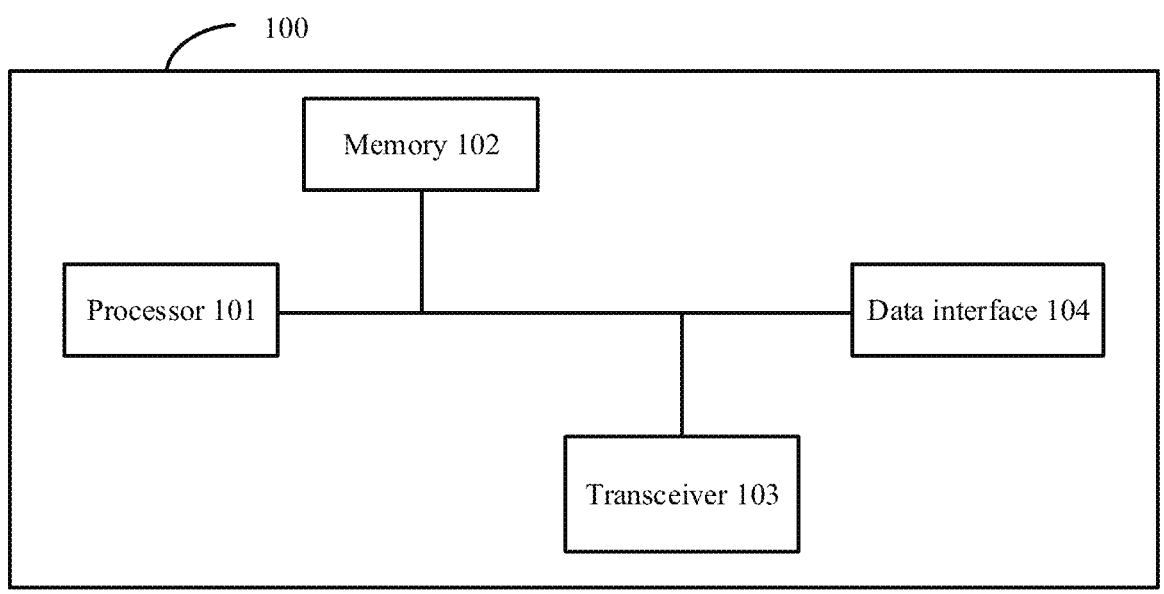
FIG. 10 is a schematic diagram of a correction value calculation service station according to this application.

Sixth Part:

FIG. 10 is a schematic structural diagram of a correction value calculation service station 100 according to this application. The correction value calculation service station 100 includes a processor 101 and a memory 102. The memory 102 is configured to store an RTK error correction model and an MRC error correction model. It should be learned that the memory 102 actually stores code. One part of the code is used to describe the RTK error correction model, and the other part is used to describe the MRC error correction model. It should be noted that the correction value calculation service station described in this part is configured to perform the positioning method described in the fifth part.

Specifically, in this embodiment, the processor 101 is configured to input an original detection value of an RTK receiver into the RTK error correction model, to obtain a first-type correction value through calculation. The processor 101 is further configured to input a converted detection value of the RTK receiver into the MRC error correction model, to obtain a second-type correction value through calculation, so that a positioning terminal corrects the original detection value of the RTK receiver based on the first-type correction value, to obtain a corrected detection value of the RTK receiver, corrects an original detection value of each common receiver based on a third-type correction value, to obtain a corrected detection value of each common receiver, and performs fusion calculation by using the corrected detection value of each common receiver and the corrected detection value of the RTK receiver, to obtain a positioning result of the RTK receiver.

It should be noted that the RTK receiver is located in the positioning terminal and has at least a capability of performing an RTK positioning algorithm. The original detection value of the RTK receiver includes a carrier (or a pseudorange) between the RTK receiver and each of a plurality of satellites that are located in a satellite navigation system and that are detected by the RTK receiver.

Further, the third-type correction value is obtained by converting the second-type correction value based on a location relationship between the common receiver and the RTK receiver.

The converted detection value of the RTK receiver is obtained by converting the original detection value of each of N common receivers based on the location relationship between the common receiver and the RTK receiver. The N common receivers are located in the positioning terminal, and each common receiver has at least a capability of measuring a pseudorange between the common receiver and a satellite that is located in the satellite navigation system and that is detected by the common receiver. N is an integer greater than or equal to 3, the N common receivers are located at N vertices of a regular N-gon, and the RTK receiver is located at a geometric center of the regular N-gon. The original detection value of the common receiver includes a pseudorange between the common receiver and each of a plurality of satellites that are located in the satellite navigation system and that are detected by the common receiver.

Further, as shown in FIG. 10, the correction value calculation service station 100 may further include a transceiver 103. The transceiver 103 is configured to send information to another communications device, and receive information from the another communications device. Specifically, the transceiver 103 is configured to receive the original detection value of the RTK receiver, and send the first-type correction value to the positioning terminal.

In an embodiment of this application, the transceiver 103 is further configured to receive the converted detection value of the RTK receiver.

In another embodiment of this application, the transceiver 103 is further configured to receive the original detection value of each common receiver. In this case, the processor 101 is further configured to convert the original detection value of each common receiver into the converted detection value of the RTK receiver based on the location relationship between the common receiver and the RTK receiver.

In still another embodiment of this application, the transceiver 103 is further configured to send the second-type correction value to the positioning terminal, so that the positioning terminal converts the second-type correction value into the third-type correction value based on the location relationship between the common receiver and the RTK receiver.

In still another embodiment of this application, the processor 101 is further configured to convert the second-type correction value into the third-type correction value based on the location relationship between the common receiver and the RTK receiver. Correspondingly, the transceiver 103 is further configured to send the third-type correction value to the positioning terminal.

It should be noted that, as shown in FIG. 10, the correction value calculation service station 100 may further include a data interface 104. It should be noted that the transceiver 103 receives information from the positioning terminal and sends information to the positioning terminal through the data interface 104. Specifically, in the correction value calculation service station 100 provided in this application, after the processor 101 obtains the first-type correction value through calculation, the transceiver 103 may deliver the first-type correction value to the positioning terminal through the data interface 103.

It should be learned that the correction value calculation service station provided in this part may be the same as the correction value calculation service station in the embodiments of the first part. In addition, the correction value calculation service station provided in the sixth part may be configured to perform the positioning method described in the fifth part. Therefore, the correction value calculation service station described in the sixth part may be understood with reference to related descriptions in the first part and the fifth part. For brevity, the repeated content is not described herein again.

Figure 11A:
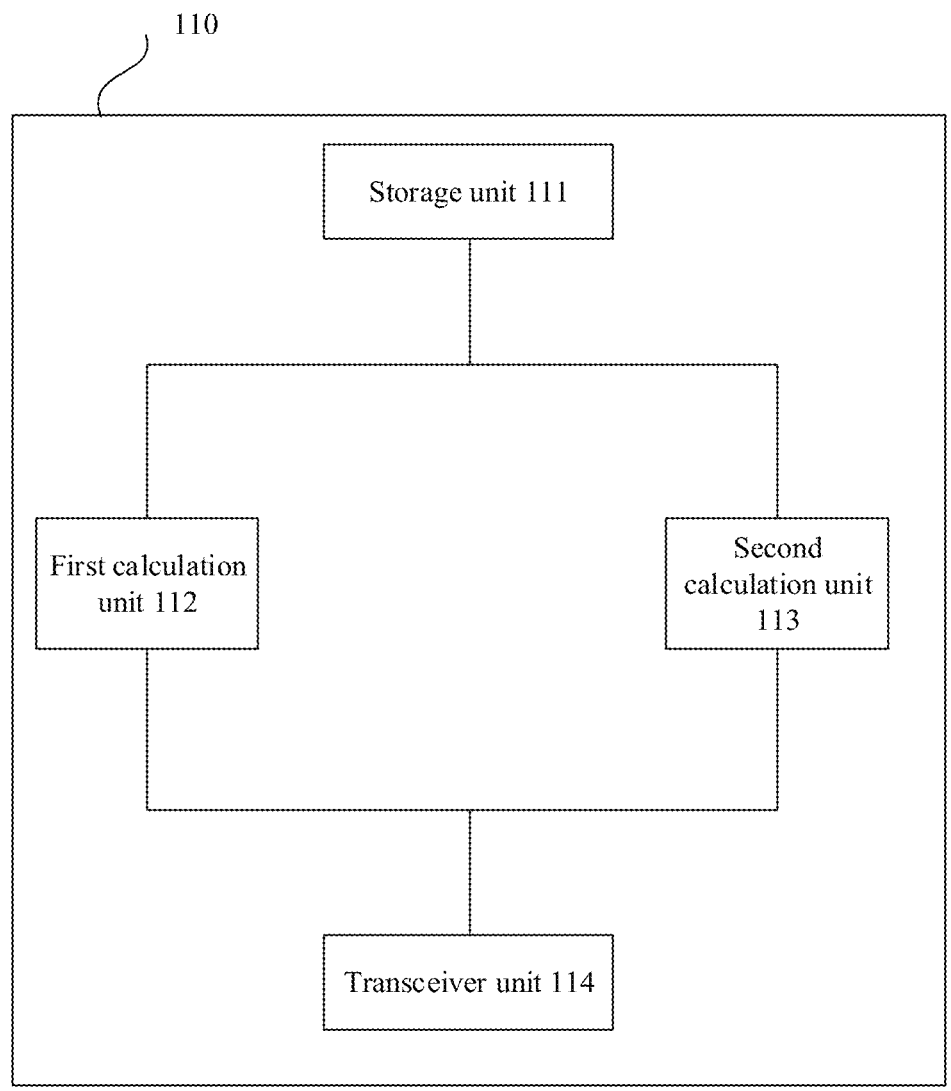
FIG. 11A is a schematic diagram of another correction value calculation service station according to this application.

Seventh Part:

FIG. 11A is a schematic structural diagram of another correction value calculation service station 110 according to this application. The correction value calculation service station 110 may be configured to perform the positioning method described in the fifth part. Specifically, the correction value calculation service station 110 includes a storage unit 111, a first calculation unit 112, and a second calculation unit 113.

The storage unit 111 is configured to store an RTK error correction model and an MRC error correction model.

The first calculation unit 112 is configured to input an original detection value of an RTK receiver into the RTK error correction model, to obtain a first-type correction value through calculation.

It should be noted that the RTK receiver is located in a positioning terminal and has at least a capability of performing an RTK positioning algorithm. The original detection value of the RTK receiver includes a carrier (or a pseudorange) between the RTK receiver and each of a plurality of satellites that are located in a satellite navigation system and that are detected by the RTK receiver.

The second calculation unit 113 is configured to input a converted detection value of the RTK receiver into the MRC error correction model, to obtain a second-type correction value through calculation, so that a positioning terminal corrects the original detection value of the RTK receiver based on the first-type correction value, to obtain a corrected detection value of the RTK receiver, corrects an original detection value of each common receiver based on a third-type correction value, to obtain a corrected detection value of each common receiver, and performs fusion calculation by using the corrected detection value of each common receiver and the corrected detection value of the RTK receiver, to obtain a positioning result of the RTK receiver.

It should be explained that the third-type correction value is obtained by converting the second-type correction value based on a location relationship between the common receiver and the RTK receiver.

The converted detection value of the RTK receiver is obtained by converting the original detection value of each of N common receivers based on the location relationship between the common receiver and the RTK receiver. The N common receivers are located in the positioning terminal, and each common receiver has at least a capability of measuring a pseudorange between the common receiver and a satellite that is located in the satellite navigation system and that is detected by the common receiver. N is an integer greater than or equal to 3, the N common receivers are located at N vertices of a regular N-gon, and the RTK receiver is located at a geometric center of the regular N-gon. The original detection value of the common receiver includes a pseudorange between the common receiver and each of a plurality of satellites that are located in the satellite navigation system and that are detected by the common receiver.

As shown in FIG. 11A, the correction value calculation service station 110 further includes a transceiver unit 114. Specifically, the transceiver unit 116 is configured to receive the original detection value of the RTK receiver, and send the first-type correction value to the positioning terminal.

In an embodiment of this application, referring to FIG. 11A, the transceiver unit 114 is further configured to receive the converted detection value of the RTK receiver. After the second-type correction value is obtained through calculation, the transceiver unit 114 is further configured to receive the second-type correction value, and send the second-type correction value to the positioning terminal.

Figure 11B:
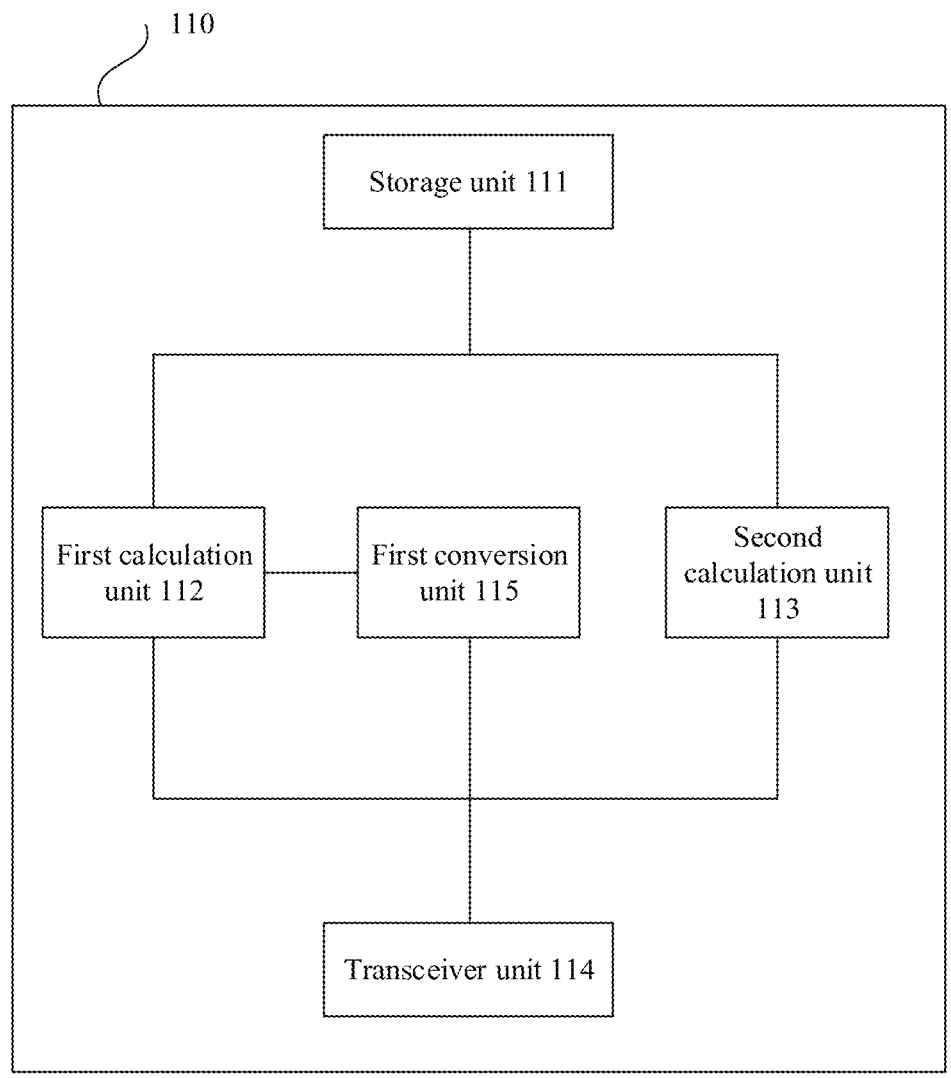
FIG. 11B is a schematic diagram of still another correction value calculation service station according to this application.

In another embodiment of this application, as shown in FIG. 11B, compared with the embodiment corresponding to FIG. 11A, the correction value calculation service station 110 in this embodiment further includes a first conversion unit 115. In this embodiment, the transceiver unit 114 is configured to receive the original detection value of each common receiver. Correspondingly, the first conversion unit 115 is configured to convert the original detection value of each common receiver into the converted detection value of the RTK receiver based on the location relationship between the common receiver and the RTK receiver.

It should be learned that after the second-type correction value is obtained through calculation, the transceiver unit 114 is further configured to send the second-type correction value to the positioning terminal.

Figure 11C:
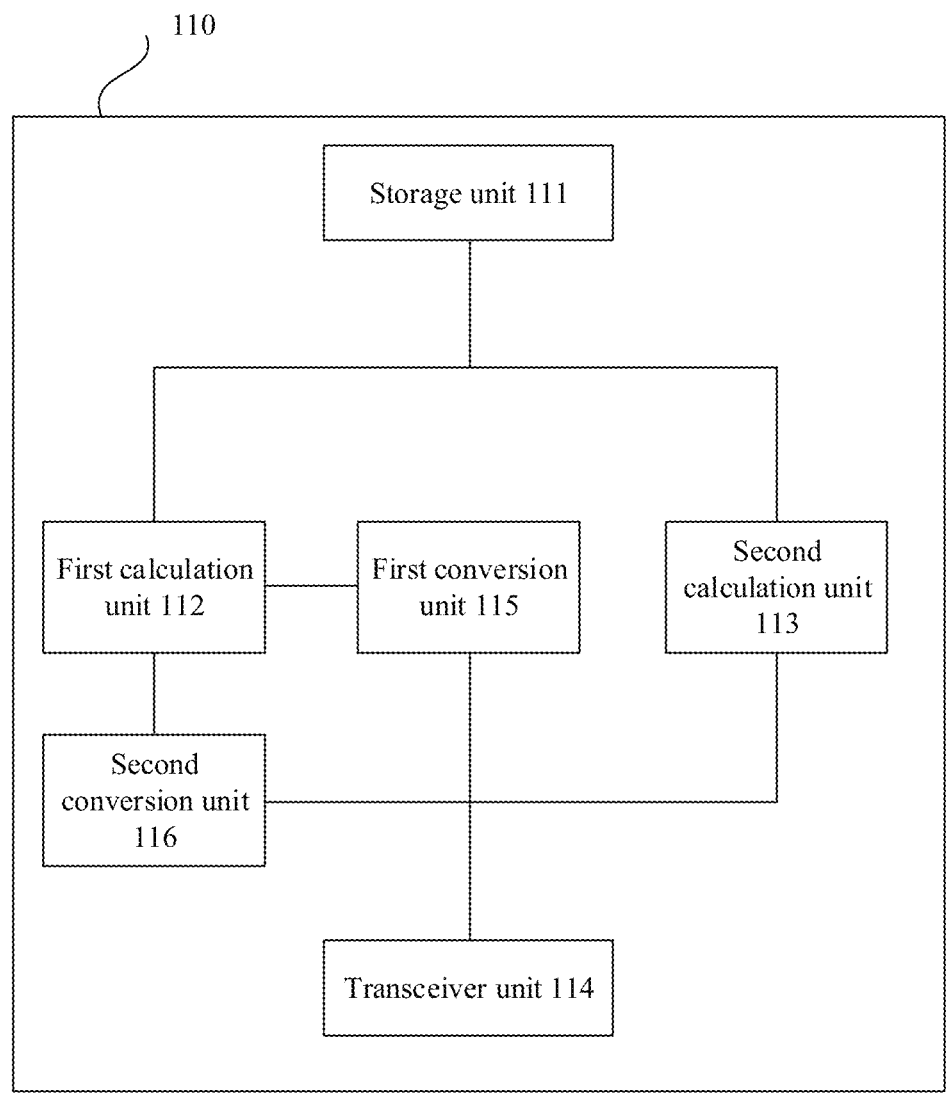
FIG. 11C is a schematic diagram of still another correction value calculation service station according to this application.

In still another embodiment of this application, as shown in FIG. 11C, compared with the embodiment corresponding to FIG. 11B, the correction value calculation service station 110 in this embodiment further includes a second conversion unit 116. A difference between the embodiment corresponding to FIG. 11C and the embodiment corresponding to FIG. 11B lies in that, after the second-type correction value is obtained through calculation, the second conversion unit 116 is configured to convert the second-type correction value into the third-type correction value based on the location relationship between the common receiver and the RTK receiver. Correspondingly, the transceiver unit 114 is configured to send the third-type correction value to the positioning terminal.

Figure 11D:
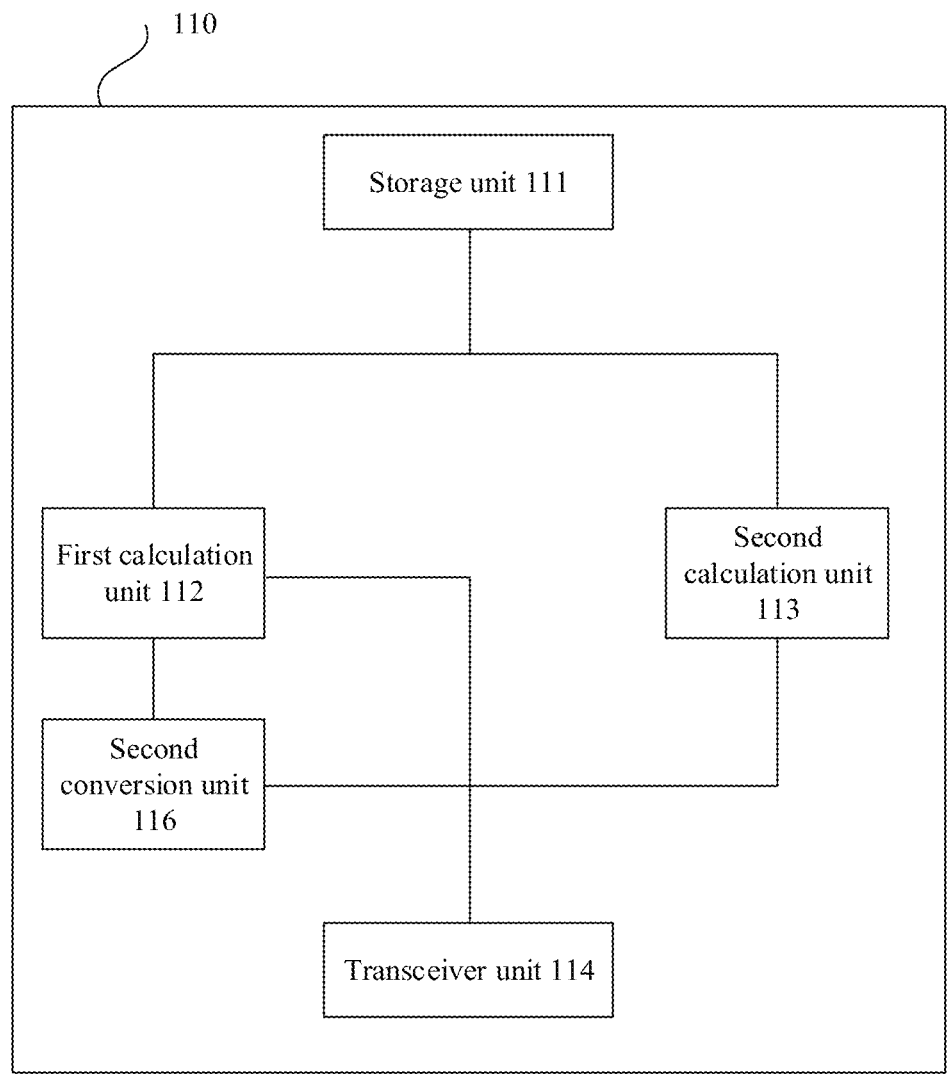
FIG. 11D is a schematic diagram of still another correction value calculation service station according to this application.

In still another embodiment of this application, as shown in FIG. 11D, compared with the embodiment corresponding to FIG. 11A, the correction value calculation service station 110 in this embodiment further includes a second conversion unit 116. A difference between the embodiment corresponding to FIG. 11D and the embodiment corresponding to FIG. 11A lies in that, after the second-type correction value is obtained through calculation, the second conversion unit 116 is configured to convert the second-type correction value into the third-type correction value based on the location relationship between the common receiver and the RTK receiver. Correspondingly, the transceiver unit 114 is configured to send the third-type correction value to the positioning terminal.

For construction of the RTK error correction model and the MRC error correction model, refer to the foregoing description. Details are not described herein again.

In addition, for the correction value calculation service station provided in this part, refer to a related limitation on the correction value calculation service station in the first part. For brevity, details are not described herein again.

Figure 12A:
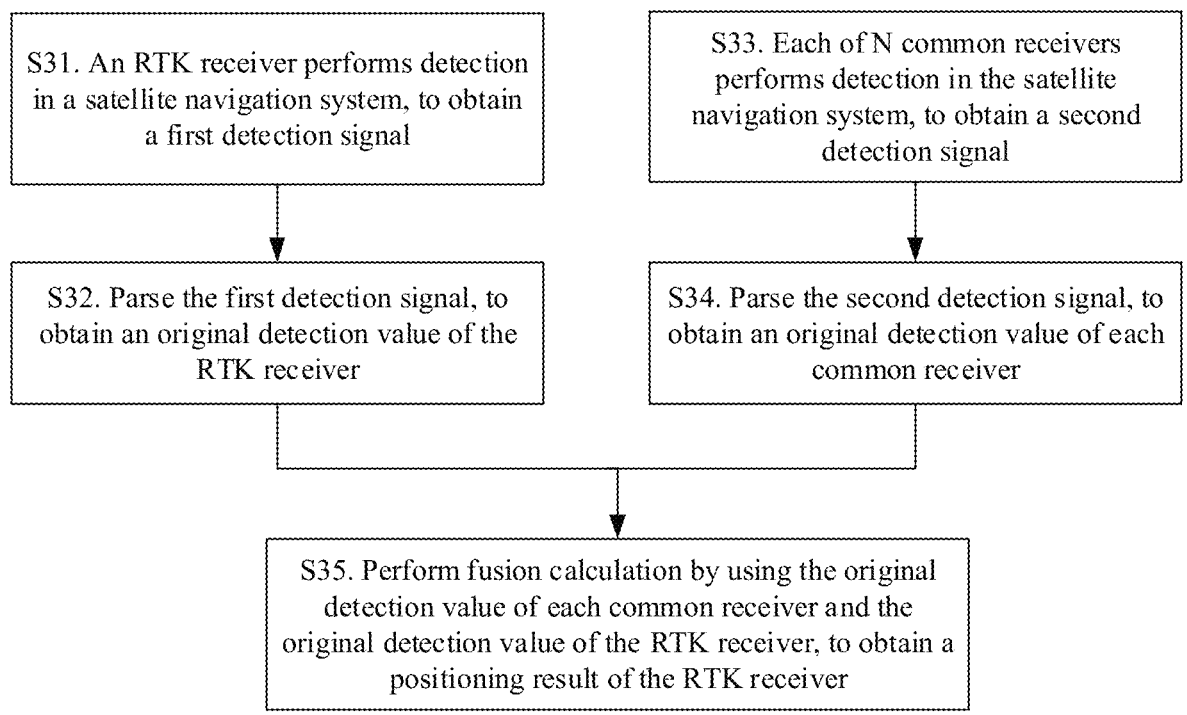
FIG. 12A is a schematic flowchart of yet another positioning method according to this application.

Eighth Part:

FIG. 12A is a flowchart of another positioning method according to this application. Specifically, the positioning method includes the following steps.

S31: An RTK receiver performs detection in a satellite navigation system, to obtain a first detection signal.

It should be noted that, the RTK receiver has at least a capability of performing an RTK positioning algorithm, and there is one RTK receiver.

S32: Parse the first detection signal, to obtain an original detection value of the RTK receiver.

The original detection value of the RTK receiver includes a carrier (or a pseudorange) between the RTK receiver and each of a plurality of satellites that are located in the satellite navigation system and that are detected by the RTK receiver.

S33: Each of N common receivers performs detection in the satellite navigation system, to obtain a second detection signal.

N is an integer greater than or equal to 3, the N common receivers are located at N vertices of a regular N-gon, and the RTK receiver is located at a geometric center of the regular N-gon. The common receiver has at least a capability of measuring a pseudorange between the common receiver and a satellite that is located in the satellite navigation system and that is detected by the common receiver.

S34: Parse the second detection signal, to obtain an original detection value of each common receiver.

S35: Perform fusion calculation by using the original detection value of the RTK receiver and the original detection value of each common receiver, to obtain a positioning result of the RTK receiver.

A difference between the positioning method provided in this part and the positioning method described in the third part lies in that S35 is different from S15. Therefore, S35 is mainly explained herein.

Figure 12B:
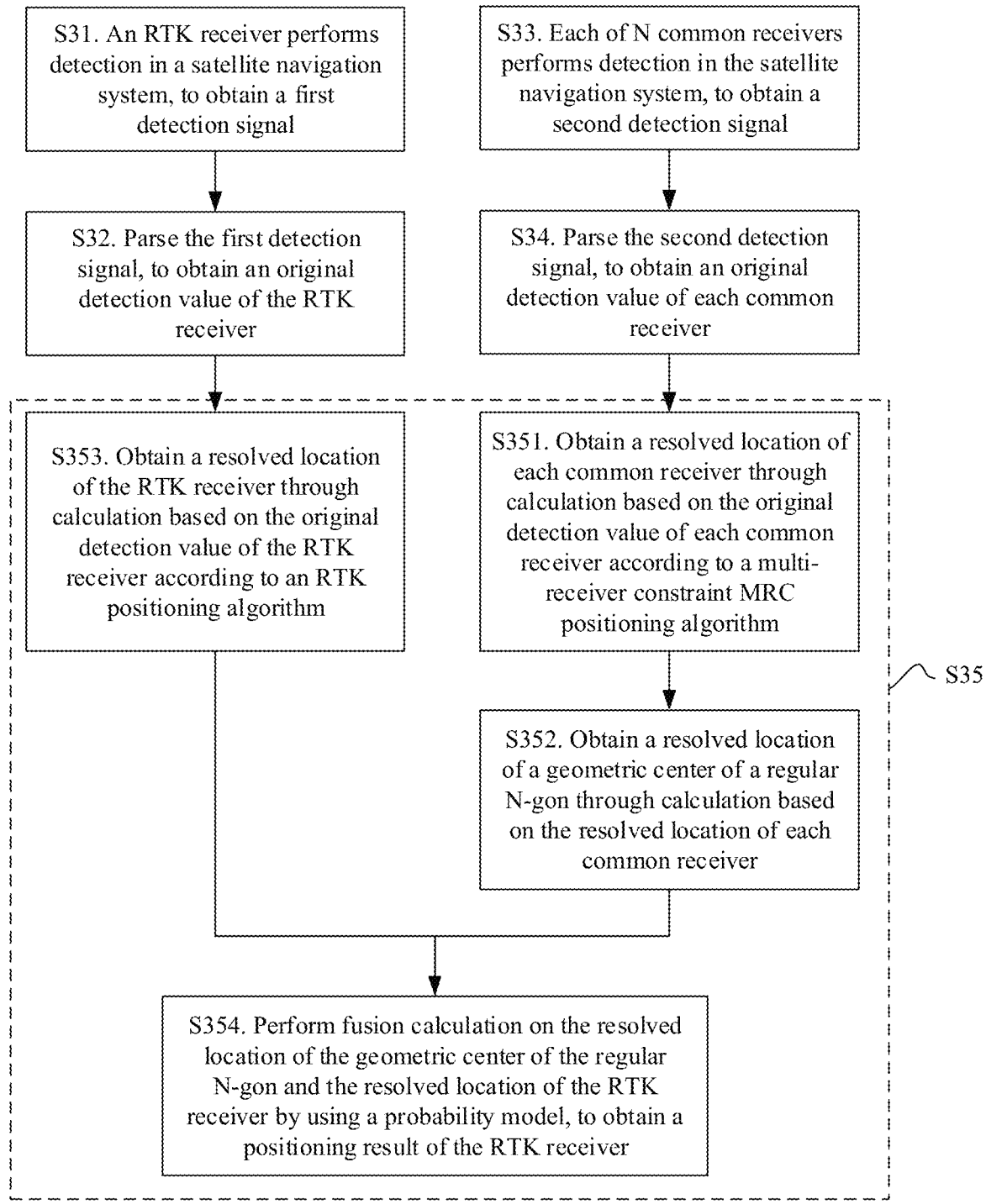
FIG. 12B is a more specific representation form of a schematic flowchart of a positioning method shown in FIG. 12A.

As shown in FIG. 12B, step S35 specifically includes S351 to S354.

S351: Obtain a resolved location of each common receiver through calculation by using the original detection value of each common receiver according to a multi-receiver constraint MRC positioning algorithm.

S352: Obtain a resolved location of the geometric center of the regular N-gon through calculation based on the resolved location of each common receiver.

S353: Obtain a resolved location of the RTK receiver through calculation by using the original detection value of the RTK receiver according to the RTK positioning algorithm.

S354: Perform fusion calculation on the resolved location of the geometric center of the regular N-gon and the resolved location of the RTK receiver by using a probability model, to obtain the positioning result of the RTK receiver.

It should be noted that, a difference between the positioning method described in this part and the positioning methods described in the first part and the third part lies in that: First, in this part (or this positioning method), the resolved location of each common receiver is calculated based on the original detection value of each common receiver rather than the third-type correction value corresponding to the original detection value of each common receiver. Second, the resolved location of the RTK receiver is calculated based on the original detection value of the RTK receiver rather than the corrected detection value of the RTK receiver. Therefore, it can be understood that, in this positioning method, the positioning result of the RTK receiver is calculated based on original detection values, that is, the original detection values rather than the corrected detection values of the common receiver and the RTK receiver. That is, the RTK error correction model and the MRC error correction model do not need to be used in this positioning method.

In addition, for another part of the positioning method, for example, a method for performing fusion calculation by using the probability model, refer to related descriptions in the first part.

Figure 13:
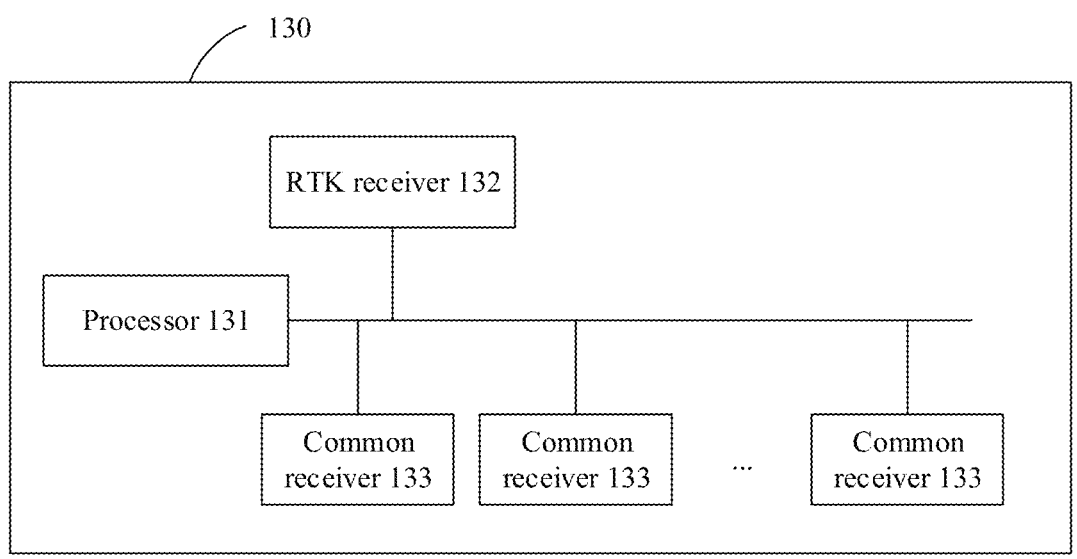
FIG. 13 is a schematic flowchart of another positioning terminal according to this application.

Ninth Part:

FIG. 13 is a schematic structural diagram of a positioning terminal 130 according to this application. The positioning terminal 130 includes a processor 131, one RTK receiver 132, and N common receivers 133. A receiver marked with 133 is a common receiver. That is, each common receiver is marked as 133. It should be noted that the positioning terminal described in this part is configured to perform the positioning method described in the eighth part.

As described above, N is an integer greater than or equal to 3, the N common receivers are located at N vertices of a regular N-gon, and the RTK receiver is located at a geometric center of the regular N-gon. The RTK receiver has at least a capability of performing an RTK positioning algorithm. The common receiver has at least a capability of measuring a pseudorange between the common receiver and a satellite that is located in a satellite navigation system and that is detected by the common receiver.

The RTK receiver 132 is configured to perform detection in the satellite navigation system, to obtain a first detection signal.

The processor 131 is configured to parse the first detection signal, to obtain an original detection value of the RTK receiver.

The original detection value of the RTK receiver includes a carrier (or a pseudorange) between the RTK receiver and each of a plurality of satellites that are located in the satellite navigation system and that are detected by the RTK receiver.

Each of the N common receivers 133 is configured to perform detection in the satellite navigation system, to obtain a second detection signal.

The processor 131 is configured to parse the second detection signal, to obtain an original detection value of each common receiver.

The original detection value of the common receiver includes a pseudorange between the common receiver and each of a plurality of satellites that are located in the satellite navigation system and that are detected by the common receiver.

It should be noted that the processor 131 is specifically configured to obtain a resolved location of each common receiver through calculation based on the original detection value of each common receiver according to a multi-receiver constraint MRC positioning algorithm, and obtain a resolved location of the geometric center of the regular N-gon through calculation based on the resolved location of each common receiver. In addition, the processor 131 is further specifically configured to obtain a resolved location of the RTK receiver through calculation by using the original detection value of the RTK receiver according to the RTK positioning algorithm. Further, the processor 131 is further specifically configured to perform fusion calculation on the resolved location of the geometric center of the regular N-gon and the resolved location of the RTK receiver by using a probability model, to obtain the positioning result of the RTK receiver.

The positioning terminal provided in this part may be configured to perform the positioning method described in the eighth part. Therefore, reference may be made to related descriptions in the eighth part to deepen understanding of the positioning terminal provided in this part. Further, the positioning terminal provided in this part and the positioning terminal in the first part have many similarities. Therefore, for a better understanding of the positioning terminal limited in this part, refer to related descriptions in the first part.

It should be noted that the foregoing embodiments are merely specific implementations of the present invention, but are not intended to limit the protection scope of this application. Therefore, the protection scope of this application shall be subject to the protection scope of the claims. Further, mutual reference may be made between the foregoing plurality of embodiments.

What is claimed is:

1. A positioning system, comprising:
a positioning terminal, configured to perform detection in a satellite navigation system, to obtain an original detection message, wherein:
the positioning terminal comprises N common receivers and one real-time kinematics (RTK) receiver, each common receiver capable of measuring a pseudorange between the common receiver and a satellite that is in the satellite navigation system and that is detected by the common receiver, and the RTK receiver capable of executing an RTK positioning algorithm;
N is an integer greater than or equal to 3, the N common receivers are located at N vertices of a regular N-gon, and the RTK receiver is located at a geometric center of the regular N-gon;
the original detection message comprises an original detection value of each common receiver and an original detection value of the RTK receiver, the original detection value of each common receiver comprises a pseudorange between the common receiver and each of a plurality of satellites that are in the satellite navigation system and that are detected by the common receiver, and the original detection value of the RTK receiver comprises a pseudorange between the RTK receiver and each of a plurality of satellites that are in the satellite navigation system and that are detected by the RTK receiver; and
the positioning terminal further configured to transmit the original detection value of the RTK receiver; and
a correction value calculation service station, configured to:
receive the original detection value of the RTK receiver from the positioning terminal,
input the original detection value of the RTK receiver into an RTK error correction model, to obtain a first correction value through calculation,
input a converted detection value of the RTK receiver into a multi-receiver constraint (MRC) error correction model, to obtain a second correction value through calculation, wherein the converted detection value of the RTK receiver is obtained by converting the original detection value of each common receiver based on a location relationship between the common receiver and the RTK receiver, and
transmit the first-type first correction value;
wherein the positioning terminal is further configured to:
receive the first correction value from the correction value calculation service station,
correct the original detection value of the RTK receiver using the first correction value, to obtain a corrected detection value of the RTK receiver, and correct the original detection value of each common receiver by using a third correction value, to obtain a corrected detection value of each common receiver, wherein the third correction value is obtained through calculation based on the second correction value and the location relationship between the common receiver and the RTK receiver; and
perform a calculation using the corrected detection value of each common receiver and the corrected detection value of the RTK receiver, to obtain a positioning result of the RTK receiver.

2. The positioning system according to claim 1, wherein the positioning terminal is further configured to convert the original detection value of each common receiver into the converted detection value of the RTK receiver based on the location relationship between the common receiver and the RTK receiver, and send the converted detection value of the RTK receiver to the correction value calculation service station; and
the correction value calculation service station is further configured to receive the converted detection value of the RTK receiver.

3. The positioning system according to claim 1, wherein the positioning terminal is further configured to send the original detection value of each common receiver to the correction value calculation service station; and
the correction value calculation service station is further configured to convert the original detection value of each common receiver into the converted detection value of the RTK receiver based on the location relationship between the common receiver and the RTK receiver.

4. The positioning system according to claim 1, wherein the correction value calculation service station is further configured to convert the second correction value into the third correction value based on the location relationship between the common receiver and the RTK receiver, and send the third correction value to the positioning terminal; and
the positioning terminal is further configured to receive the third correction value.

5. The positioning system according to claim 1, wherein the correction value calculation service station is further configured to send the second correction value to the positioning terminal; and
the positioning terminal is further configured to receive the second correction value, and convert the second correction value into the third correction value based on the location relationship between the common receiver and the RTK receiver.

6. The positioning system according to claim 1, wherein the positioning terminal is specifically configured to:
obtain a resolved location of each common receiver through calculation by using the corrected detection value of each common receiver according to an MRC positioning algorithm;
obtain a resolved location of the geometric center of the regular N-gon through calculation based on the resolved location of each common receiver;
obtain a resolved location of the RTK receiver through calculation by using the corrected detection value of the RTK receiver according to the RTK positioning algorithm; and
perform a calculation on the resolved location of the geometric center of the regular N-gon and the resolved location of the RTK receiver by using probability distributions of the location of the geometric center of the regular N-gon and the location of the RTK receiver, to obtain the positioning result of the RTK receiver.

7. The positioning system according to claim 1, wherein the RTK error correction model is constructed according to a regression equation y=ƒ(x), x is the original detection value of the RTK receiver, y is the first correction value, ƒ(•) is a mapping function from x to y, and ƒ(•) is obtained through training after a neural network is constructed and the carrier or the pseudorange between the RTK receiver and each satellite detected by the RTK receiver is input into the neural network.

8. The positioning system according to claim 1, wherein the MRC error correction model is constructed according to a regression equation y=ƒ(x), x is the original detection value of each common receiver, y is the second correction value, ƒ(•) is a mapping function from x to y, and ƒ(•) is obtained through training after a neural network is constructed and a pseudorange between each common receiver and each satellite detected by the corresponding common receiver is input into the neural network.

9. A positioning method, comprising:
  performing, by a positioning terminal, detection in a satellite navigation system, to obtain an original detection message, wherein the positioning terminal comprises N common receivers and one real-time kinematics (RTK) receiver, each common receiver capable of measuring a pseudorange between the common receiver and a satellite that is in the satellite navigation system and that is detected by the common receiver, and the RTK receiver capable of executing an RTK positioning algorithm; wherein:
    N is an integer greater than or equal to 3, the N common receivers are located at N vertices of a regular N-gon, and the RTK receiver is located at a geometric center of the regular N-gon; and
    the original detection message comprises an original detection value of each common receiver and an original detection value of the RTK receiver, the original detection value of each common receiver comprises a pseudorange between the common receiver and each of a plurality of satellites that are in the satellite navigation system and that are detected by the common receiver, and the original detection value of the RTK receiver comprises a pseudorange between the RTK receiver and each of a plurality of satellites that are in the satellite navigation system and that are detected by the RTK receiver;
  transmitting, by the positioning terminal, the original detection value of the RTK receiver;
  receiving, by a correction value calculation service station, the original detection value of the RTK receiver;
  inputting, by the correction value calculation service station, the original detection value of the RTK receiver into an RTK error correction model, to obtain a first correction value through calculation;
  inputting, the correction value calculation service station, a converted detection value of the RTK receiver into a multi-receiver constraint (MRC) error correction model, to obtain a second correction value through calculation, wherein the converted detection value of the RTK receiver is obtained by converting the original detection value of each common receiver based on a location relationship between the common receiver and the RTK receiver;
  transmitting, by the correction value calculation service station, the first correction value;
  receiving, by the positioning terminal, the first correction value;
  correcting, by the positioning terminal, the original detection value of the RTK receiver using the first correction value, to obtain a corrected detection value of the RTK receiver,
  correcting, by the positioning terminal, the original detection value of each common receiver by using a third correction value, to obtain a corrected detection value of each common receiver, and
  performing, by the positioning terminal, a calculation using the corrected detection value of each common receiver and the corrected detection value of the RTK receiver, to obtain a positioning result of the RTK receiver, wherein the third correction value is obtained through calculation based on the second correction value and the location relationship between the common receiver and the RTK receiver.

10. The positioning method according to claim 9, wherein the positioning terminal converts the original detection value of each common receiver into the converted detection value of the RTK receiver based on the location relationship between the common receiver and the RTK receiver, and sends the converted detection value of the RTK receiver to the correction value calculation service station; and
  the correction value calculation service station receives the converted detection value of the RTK receiver.

11. The positioning method according to claim 9, wherein the positioning terminal sends the original detection value of each common receiver to the correction value calculation service station; and
  the correction value calculation service station receives the original detection value of each common receiver, and converts the original detection value of each common receiver into the converted detection value of the RTK receiver based on the location relationship between the common receiver and the RTK receiver.

12. The positioning method according to claim 9, wherein the correction value calculation service station converts the second correction value into the third correction value based on the location relationship between the common receiver and the RTK receiver, and sends the third-type correction value to the positioning terminal; and
  the positioning terminal receives the third correction value.

13. The positioning method according to claim 9, wherein the correction value calculation service station sends the second correction value to the positioning terminal; and
  the positioning terminal receives the second correction value, and converts the second correction value into the third correction value based on the location relationship between the common receiver and the RTK receiver.

14. The positioning method according to claim 9, wherein the step of performing the calculation specifically comprises:
  obtaining, by the positioning terminal, a resolved location of each common receiver through calculation by using the corrected detection value of each common receiver according to an MRC positioning algorithm;
  obtaining a resolved location of the geometric center of the regular N-gon through calculation based on the resolved location of each common receiver;
  obtaining, by the positioning terminal, a resolved location of the RTK receiver through calculation by using the corrected detection value of the RTK receiver according to the RTK positioning algorithm; and performing, by the positioning terminal, a calculation on the resolved location of the geometric center of the regular N-gon and the resolved location of the RTK receiver by using probability distributions of the location of the geometric center of the regular N-gon and the location of the RTK receiver, to obtain the positioning result of the RTK receiver.

15. The positioning method according to claim 9, wherein the RTK error correction model is constructed according to a regression equation $y=f(x)$, x is the original detection value of the RTK receiver, y is the first correction value, $f(\bullet)$ is a mapping function from x to y, and $f(\bullet)$ is obtained through training after a neural network is constructed and the carrier or the pseudorange between the RTK receiver and each satellite detected by the RTK receiver is input into the neural network.

16. The positioning method according to claim 9, wherein the MRC error correction model is constructed according to a regression equation $y=f(x)$, x is the original detection value of each common receiver, y is the second correction value, $f(\bullet)$ is a mapping function from x to y, and $f(\bullet)$ is obtained through training after a neural network is constructed and a pseudorange between each common receiver and each satellite detected by the corresponding common receiver is input into the neural network.

* * * * *